United States Patent
Lerber et al.

(10) Patent No.: US 12,406,695 B1
(45) Date of Patent: Sep. 2, 2025

(54) DIFFERENTIAL PHASE VOXEL SYMBOL DETERMINATION

(71) Applicant: Microsoft Technology Licensing, LLC, Redmond, WA (US)

(72) Inventors: Tuomo Antero von Lerber, Helsinki (FI); Simo Kaarlo Tapani Tammela, Espoo (FI); Anton Viljami Autere, Järvenpää (FI); Birgit Siviä Debora Päivänranta, Espoo (FI); Philip Athelstan Wainman, Cambridge (GB); Krista Anna Alice Paasonen, Espoo (FI); Esa Tapani Räikkönen, Espoo (FI); Antti Pekka Virolainen, Helsinki (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/755,584

(22) Filed: Jun. 26, 2024

(51) Int. Cl.
G11B 7/013 (2006.01)

(52) U.S. Cl.
CPC .................... G11B 7/013 (2013.01)

(58) Field of Classification Search
None
See application file for complete search history.

(56) References Cited

U.S. PATENT DOCUMENTS

| | | | |
|---|---|---|---|
| 6,091,496 A * | 7/2000 | Hill | G02B 21/004 356/497 |
| 2003/0039001 A1 * | 2/2003 | King | G11B 7/0065 |
| 2012/0253196 A1 * | 10/2012 | Nagata | A61B 8/5292 600/443 |
| 2017/0263281 A1 * | 9/2017 | Chung | G03H 1/2205 |

* cited by examiner

Primary Examiner — Peter Vincent Agustin
(74) Attorney, Agent, or Firm — Mark K. Young; Mark K. Young PC

(57) ABSTRACT

A differential voxel symbol reader is alternatively configured to detect phase or polarization changes in a probe light beam caused by interactions with voxels distributed in an optical storage medium as light-scattering nanostructures. Rather than determine an absolute change in the state of the probe signal from an interaction with a voxel being read, a relative change is detected by comparing the probe light beam against an orthogonally-polarized reference light beam that propagates over an overlapping path with the probe light beam. The overlapping paths for the probe and reference light beams provide that each is subject to substantially the same impairments during propagation through the medium. The overlap largely cancels the effects of light scattering and impairments from the other voxels in the medium that cause shifts in phase and/or polarization which would otherwise scramble the signals to thereby reduce the accuracy and reliability of the reading process.

20 Claims, 25 Drawing Sheets

300

400

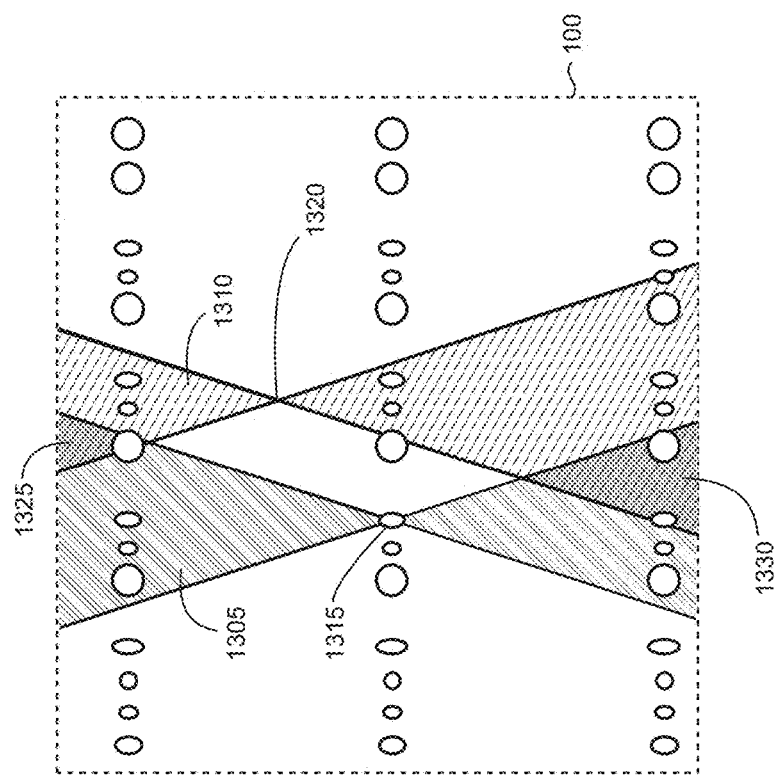
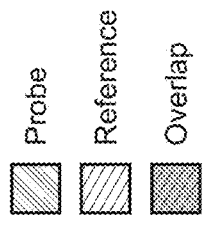
FIG 14
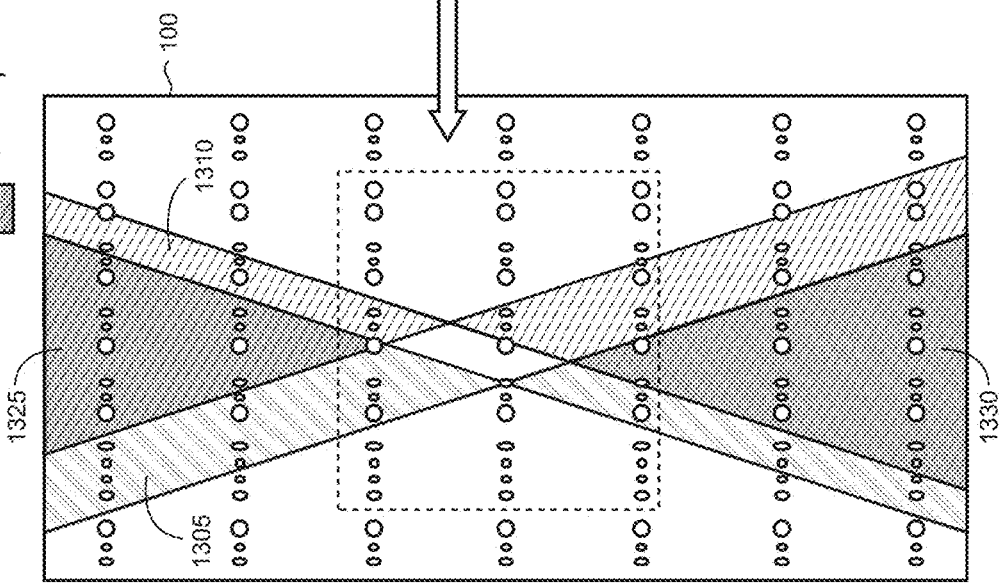
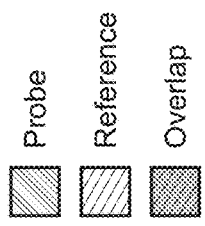
FIG 13

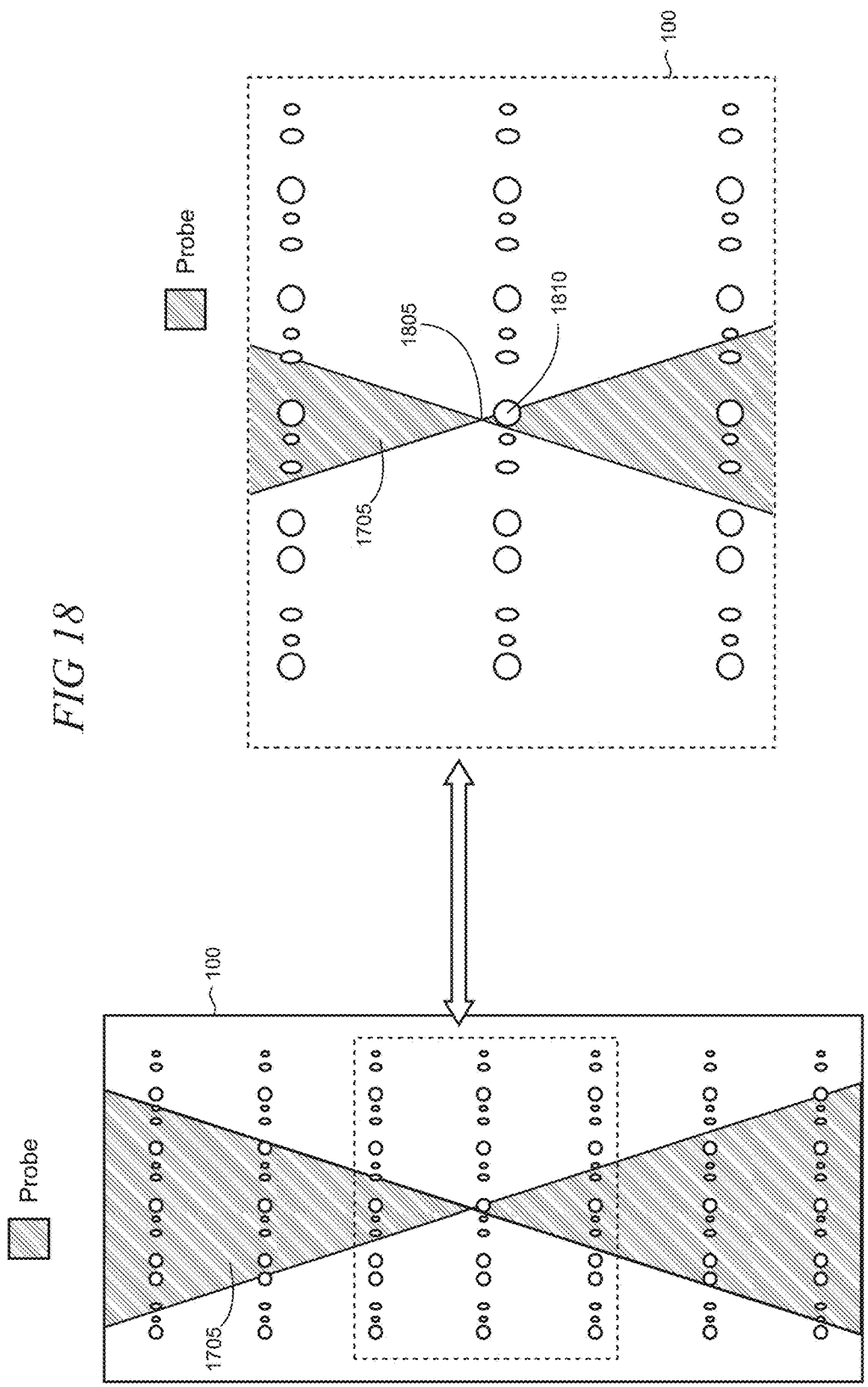

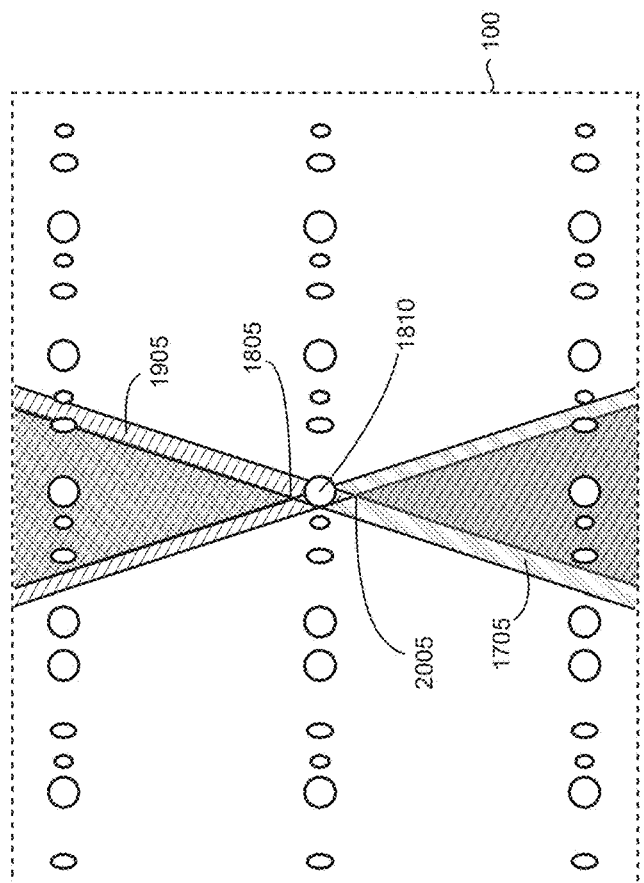
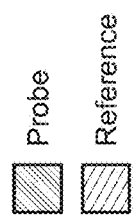
*FIG 22*
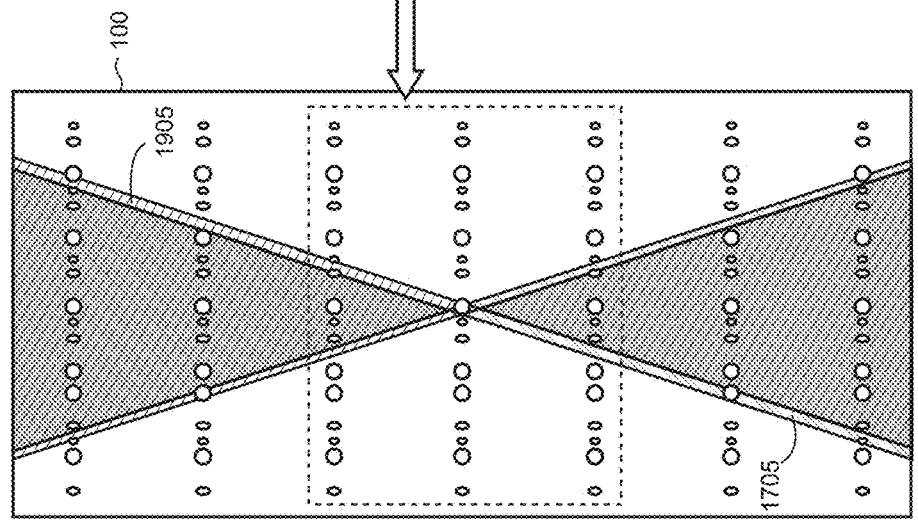
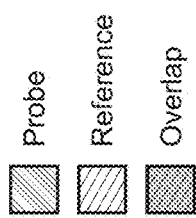
*FIG 21*

560

2700

2600

2900

2800

3100

3000

3300

3200

3400

3500

3800

DIFFERENTIAL PHASE VOXEL SYMBOL DETERMINATION

BACKGROUND

Mass storage of digital data relies on conversion of the data into a persistent, physical perturbation, or state change, within a data-storage medium. Conversely, retrieving previously stored data from a data-storage medium requires probing the medium to detect the perturbation. Perturbations applicable to high-throughput, high-density data storage include, for example, localized changes in the magnetic or optical properties of a medium. However, processes used to store and retrieve data may be subject to interference.

SUMMARY

A voxel is a light-scattering nanostructure located in a transparent optical storage medium that alters properties (e.g., phase, polarization, magnitude, etc.) of light beams interacting with the voxel as the beams propagate through the medium. A plurality of voxels written as a multi-layered array into a durable low-cost glass optical storage medium is utilized to store symbols for differentially encoded data, for example, in write-once-read-many (WORM) applications for mass data storage.

A differential voxel reader reads a stream of symbols by sequentially irradiating individual voxels within the optical storage medium. The voxel symbol reading process uses two beams, including orthogonally-polarized probe and reference light beams, propagating along overlapping paths through the optical storage medium. The probe light beam is focused at or near a voxel to be read while the reference light beam is focused at another location within the medium.

The differential voxel reader receives the probe and reference light beams upon their exit from the optical storage medium where their orthogonal polarization states enable them to be distinguishable. A voxel symbol value is determined by comparing a difference between the received probe and reference light beams. In an illustrative embodiment, a relative phase difference between the probe and reference light beams is detected to determine a voxel symbol value. In another illustrative embodiment, a relative difference in polarization state between the probe and reference light beams is utilized to determine a voxel symbol value.

In illustrative embodiments of the differential voxel reader, differential phase changes between orthogonally-polarized probe and reference light beams are detected when reading symbols from voxels in the optical storage medium. For a differential phase shift keying (DPSK) type of encoding approach using two phase values per symbol, the reader uses a polarization beam splitter (PBS) cube that splits the beams with equal contributions of probe and reference signals that respectively impinge on a pair of photodetectors. The photodetectors convert the optical signals into electrical signals as inputs into a differential amplifier that generates a difference signal for the probe and reference signals. For a differential quadrature phase shift keying (DQPSK) encoding approach using four phase values per symbol, a pair of PBS cubes is utilized with suitable retarding waveplates to respectively provide two pairs of outputs to two pairs of photodetectors. The pairs of photodetectors are electrically coupled to respective pairs of differential amplifiers to generate a pair of difference signals for the probe and reference signals.

The present differential voxel symbol reading is advantageously robust against signal impairments that arise when reading data stored in the optical storage medium. Because the probe and reference light beams propagate over overlapping paths through the optical storage medium, they are subject to nearly the same perturbations in the medium, such as light scattering from the multi-layered voxel array, that impair the probe and reference in a substantially equal manner. The use of overlapping propagation paths can largely cancel shifts in the light beams (that would otherwise interfere with the reading of symbol values) and improve signal-to-noise ratio to reduce the bit error rate of the reading process. The determination of symbol values by detecting differential changes enables accurate and reliable reading of data stored in the optical storage medium that provides a readily scalable approach to mass data storage. In addition, the large bandwidth of the photodetectors in the differential voxel reader provides higher data read rates compared to, for example, reading techniques that rely on image processing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 13 shows a second set of illustrative beam profiles for the probe and reference light beams;

FIG. 14 is an enlarged view of the second set of illustrative beam profiles;

FIG. 17 shows a fourth illustrative beam profile for only the probe light beam;

FIG. 18 shows an enlarged view of the beam profile for only the probe light beam;

FIG. 21 shows a fourth set of illustrative beam profiles for the combined probe and reference light beams;

FIG. 22 shows an enlarged view of the fourth set of illustrative beam profiles;

Like reference numerals indicate like elements in the drawings. Elements are not drawn to scale.

DETAILED DESCRIPTION

Demand for archival storage for high-value, long-lived data continues to grow exponentially. Cloud archival storage providers exploit statistical multiplexing of many customers' workloads onto a shared storage platform to offer the lowest cost storage. Today, in all large-scale cloud providers, the most cost-effective media is magnetic, usually combining hard disk drives (HDDs) and tape. All magnetic media has limited lifetimes, and the data on it degrades over time, thus the data needs to be migrated. In particular, HDDs have about a 5-year lifetime and tape about a 10-year lifetime. Since bit rot occurs in both magnetic media types over time, storage systems use scrubbing to guarantee data integrity. In addition, both have significant media costs, requiring garbage collection and defragmentation over time. As a result, while it may be intuitive to assume that data storage costs are a function of the customer access rates, for most archival workloads, the background management accesses associated with the refresh cycle, data integrity checking, and garbage collection dominate user accesses. Hence, these background management accesses also dominate the costs associated with storing data. Since most archival data is rarely accessed, the environmental and financial costs of storing archival data on magnetic media increase over time.

Archival storage systems designed using glass storage media are providing a clean-slate approach to service modern cloud archival workloads sustainably, reliably, and efficiently. Using glass provides extremely low-cost Write-Once-Read-Many (WORM) media with no bit rot over more than 1000 years. This latter property means that the media removes the need for integrity checking, minimizing energy usage over time. Since the media is low-cost, it also removes the need to perform active garbage collection. Finally, the design of the storage system around glass media removes the need for the refresh cycle, allowing data to be left in situ, and dramatically reducing the carbon footprint of long-lived data.

Figure 1:
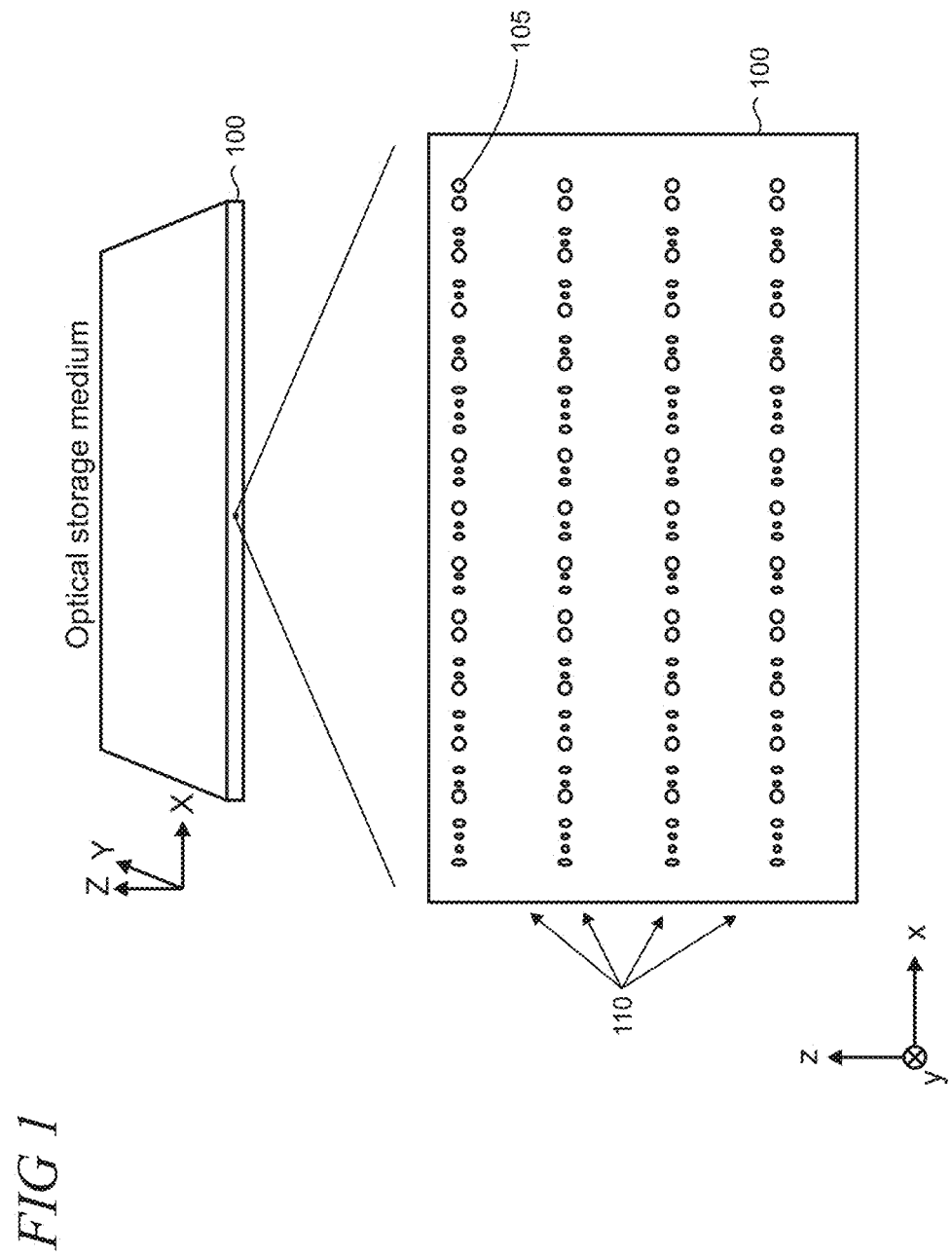
FIG. 1 shows an illustrative optical storage medium that includes a plurality of voxels arranged in a three-dimensional array.

Turning now to the drawings, FIG. 1 shows an illustrative optical storage medium 100 that includes a plurality of voxels, representatively indicated by reference numeral 105, that are arranged in a three-dimensional array. The substrate for the optical storage medium is transparent and typically takes the form of bulk glass including borosilicate or fused silica (i.e., quartz) glasses. Alternatively, the substrate may comprise polymers. The substrate may be formed using a relatively thin optical layer that is coupled to a mechanically stable supporting layer in some applications. Glass is typically an ideal media for archival storage because it has three suitable properties: (i) it is low-cost; (ii) it is chemically inert and therefore durable and resilient to the environment (e.g. temperature, moisture, and electromagnetic interference); and (iii) the structures used to store data have lifetimes of over a thousand years.

The voxels 105 are light-scattering nanostructures that are embedded in the optical storage medium 100. The voxels are typically written in layers 110 to encode digital data that is read optically, as described below. Data is stored in the glass by making permanent physical modifications within the volume of the medium which are not susceptible to bit rot or corruption. Therefore, glass is sustainable and provides a cost-effective WORM medium.

Figure 2:
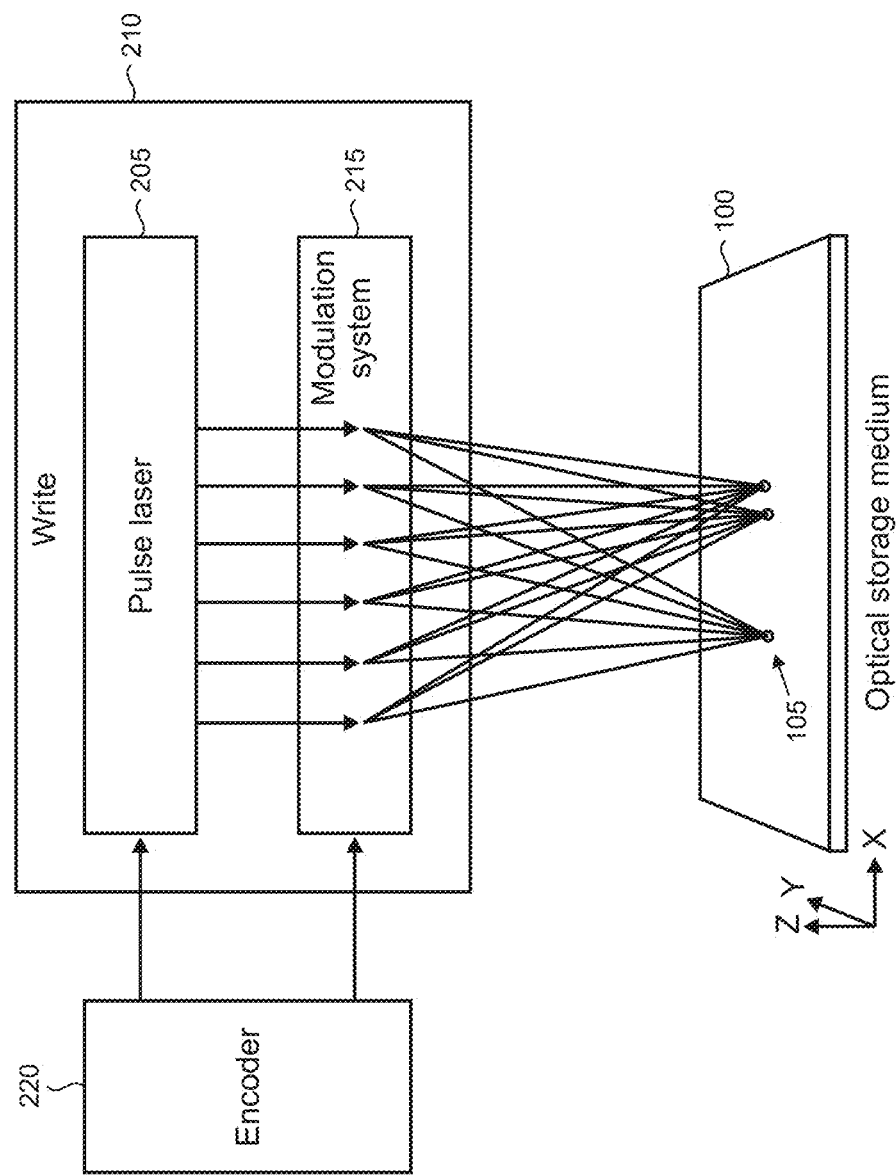
FIG. 2 shows details of an illustrative optical data write component.

The permanent modifications change the physical structure of the glass to form the voxels 105. As shown in FIG. 2, they can be created using femtosecond-scale ($\sim 10^{-15}$ seconds) high power pulses from an ultrashort pulse laser 205 in a write component 210. To create a voxel 105, pulses are focused at varying depths into the glass of the optical storage medium 100. A single voxel can typically encode multiple bits by modulating the polarization of the laser beam and the pulse energy during voxel creation using a modulation system 215 based on instructions from an encoder 220. The voxels extend in three dimensions within the volume provided by the optical storage medium. Voxels are written side-by-side by the write system in two-dimensional layered arrays across the XY plane, and many hundreds of layers along the Z dimensional can typically be created.

The write and read systems for the optical storage medium 100 can be arranged independently using different underlying technologies. Reading voxels is generally prone to noise and errors. The reading light must propagate through many voxel layers before and after the layer containing a voxel of interest. For example, if the optical storage medium contains 200 layers of voxels, the reading light will propagate through 199 layers of voxels that distort the phase of the light and scramble the signal which makes signal measurement noisy.

Current read systems utilize, for example, differential phase microscopy and image post-processing using machine learning/artificial intelligence which can provide satisfactory results in many applications. However, such systems are relatively computationally expensive and may become less robust with increased light scattering from neighboring layers which causes a decrease in the signal-to-noise ratio (SNR). Therefore, current voxel read systems may not scale effectively for all applications and may limit voxel storage density in the optical storage medium.

Figure 3:
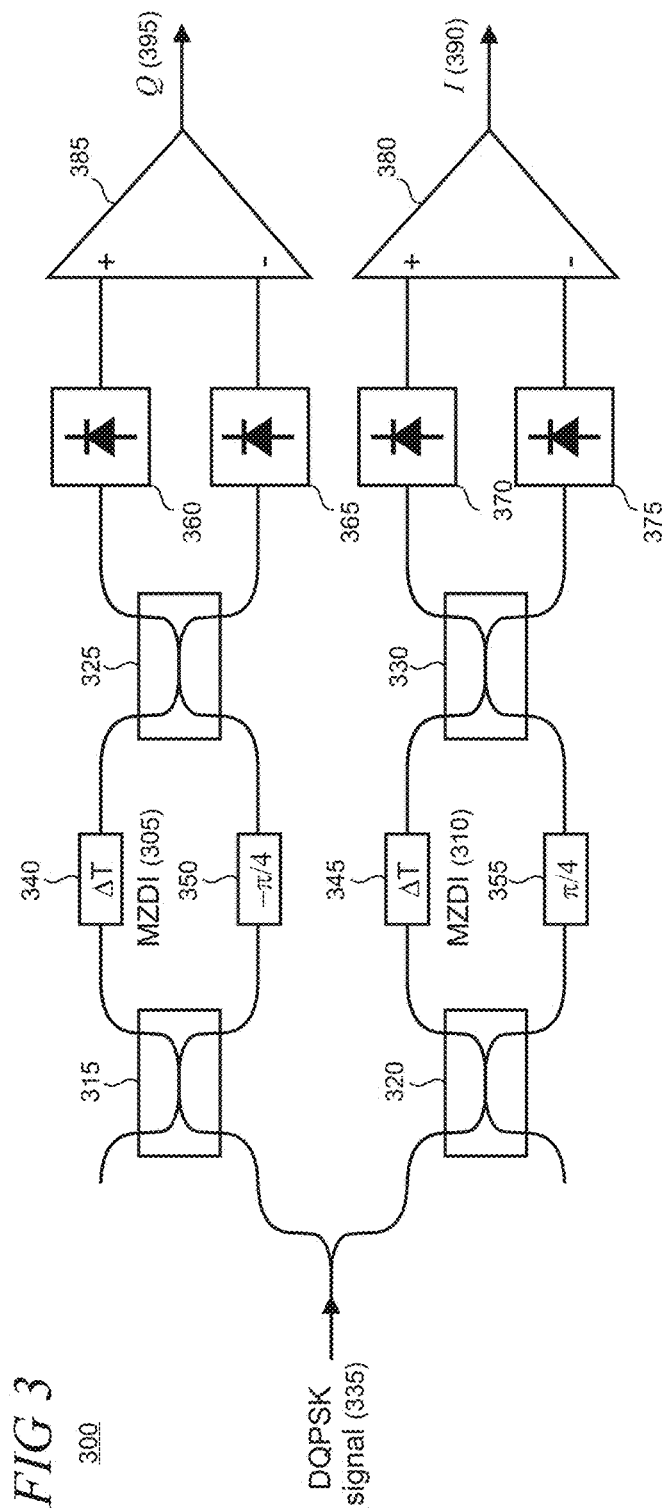
FIG. 3 shows an illustrative differential quadrature phase shift keying (DQPSK) receiver that is commonly utilized in telecommunications applications.

The present principles for voxel reading use an adaptation of differential encoding techniques that have been used successfully in the wireless and optical communications systems for several decades. FIG. 3 shows an illustrative differential quadrature phase shift keying (DQPSK) receiver 300 that determines values of symbols sequentially received as optical signals by comparing two-consecutive symbols with each other (a symbol is defined as a discrete carrier wave state). The purpose of the comparison is to provide a coherent reference such that information of interest is carried in the difference between successive symbols. This coherent-referencing feature frees the receiver from being phase-and-frequency-synchronized with the sinusoid generated by the transmitter as the carrier wave. However, the receiver still benefits from the inherently robust nature of the phase-shift keyed signal encoding.

The robustness is achieved because both symbols propagate nearly (or exactly) over the same optical path, experiencing similar or the same signal perturbations, so that accumulated phase noise is almost the same for each symbol. As a result, using the difference between the symbols removes the majority of signal impairments to provide accurate and reliable data transmission without the complexity and cost, for example, of implementing carrier recovery for coherent demodulation.

The DQPSK receiver 300 uses two parallel Mach-Zehnder delay interferometers (MZDIs) 305 and 310 that are coupled via respective pairs of 2×2 input couplers 315 and 320 and 2×2 output couplers 325 and 330. Each MZDI facilitates extraction of information from the optical phase of an optical DQPSK signal 335 through the interference of two consecutive symbols (i.e., symbols that are adjacent to each other in the time domain). Each input to an MZDI is split into two parts where one part (on the upper path in the MZDIs as shown in the drawing) is delayed, usually over a single symbol period ΔT, as indicated by reference numerals 340 and 345.

The lower paths in the MZDIs 305 and 310 are phase shifted compared to the upper paths, by −π/4 and π/4, respectively, as indicated by reference numerals 350 and 355. This phase difference is needed for selection by the MZDIs of either the I (the in-phase, real component) or Q (the quadrature, complex component) data streams of the DQPSK signal.

Figure 4:
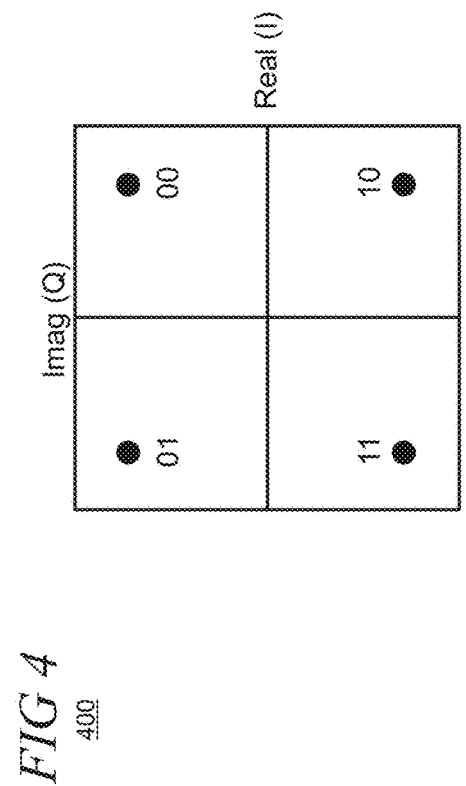
FIG. 4 shows an illustrative DQPSK symbol constellation.

The MZDIs 305 and 310 are followed by photodetectors 360, 365, 370, and 375 which convert the optical signals into electrical signals as inputs to a pair of differential amplifiers 380 and 385. The differential amplifiers respectively generate I and Q electrical signals as outputs 390 and 395. The I and Q signals are represented in a constellation diagram 400 in FIG. 4 which shows all possible symbol values in the complex plane. With DQPSK, using four possible phase shifts, two bits per symbol can be sent from a DQPSK transmitter (not shown) to the DQPSK receiver 300.

Figure 5:
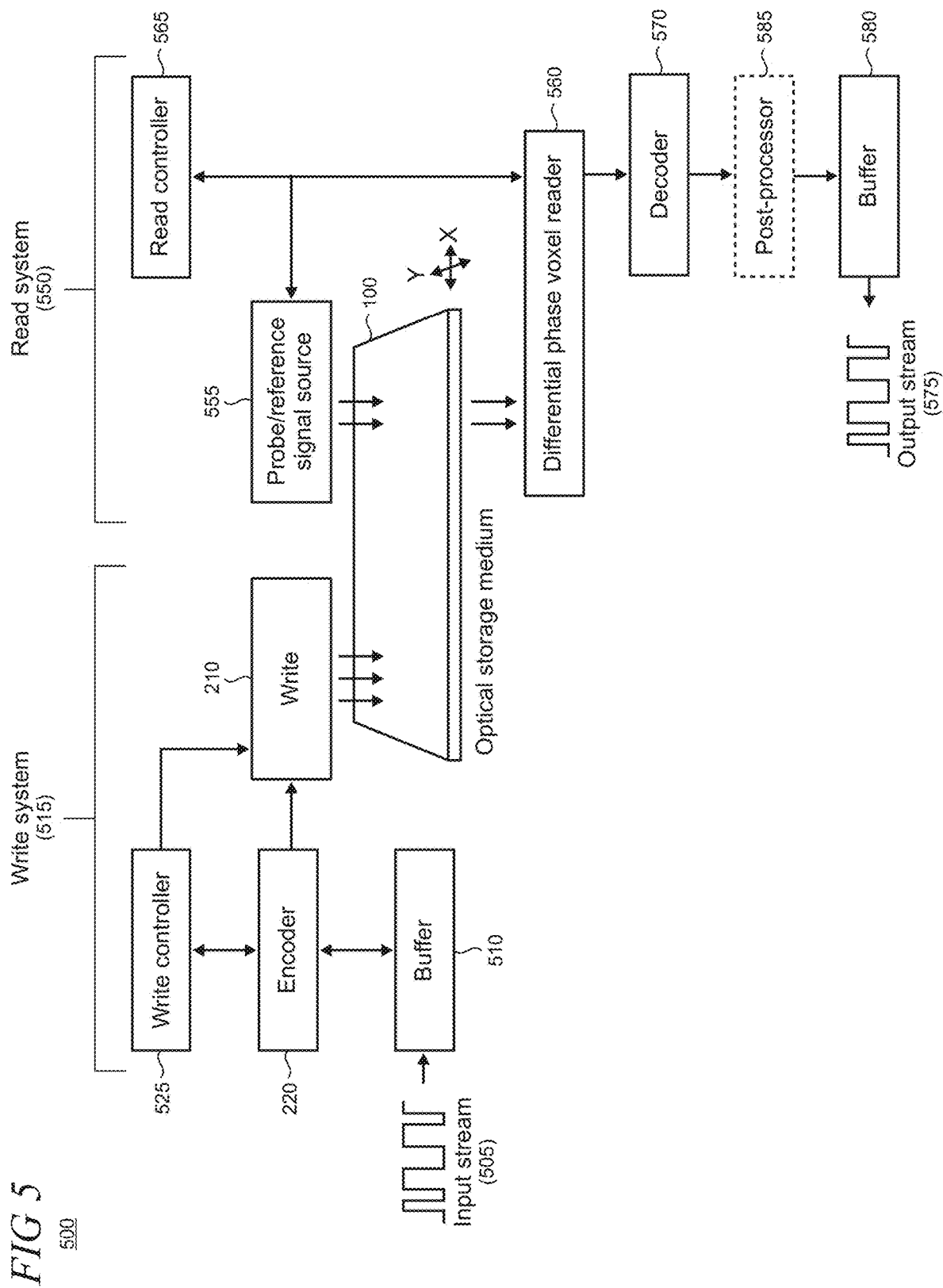
FIG. 5 shows an illustrative optical data write and read system in which an optical storage medium is moved relative to fixedly-located writing and reading components.

FIG. 5 shows an illustrative optical data write and read architecture 500 that employs the present principles for reading data from an optical storage medium 100. It is emphasized that while the constituent write and read systems are shown in the same drawing, they may be operated independently and non-simultaneously. For example, in typical mass storage scenarios, data is written to a plurality of optical storage media for archiving in a storage library. At some later time, one or more optical storage media are retrieved from storage and read using the processes described herein to access the stored data. Mass storage providers have the flexibility to separately support and provision the write, storage, and read processes. Providers can apply and scale resources as needed to meet variability of workloads across datacenters so that write, storage, and read capacities are efficiently utilized without excess capacity being stranded and/or insufficient capacity causing bottlenecks and delays.

An input data stream 505 to be written to the optical storage medium 100 is buffered in a buffer 510 in a write system 515. The encoder 220 parses the data in the buffer to provide suitable signals to a write component 210 under control of a write controller 525. The form factor of the optical storage medium can vary to meet the requirements of a given implementation. In this illustrative example, the form factor is rectangular and is arranged on a translational stage (not shown) on the XY plane that facilitates movement in the relative positioning between the optical storage medium and the write component. Voxels may be written at different locations in the XY plane of the volume while the write pulse laser is focused at varying depths to produce layers of voxels along the Z axis. The changing positioning of the optical storage medium with respect to the reading component can likewise facilitate the reading of voxels from various locations throughout the volume.

In this illustrative embodiment, a read system 550 includes one or more sources 555 for probe and reference light beams and a differential phase voxel reader 560 that are coupled to a read controller 565. The output of the reader is provided to a decoder 570 that writes a decoded output data stream 575 into a buffer 580. A post-processor 585 is optionally utilized in some use cases to assist determination of symbol values. The post-processor can implement a variety of different techniques, as appropriate, such as noise suppression using analog and/or digital circuits. The post-processor can also utilize software-based processing for post voxel detection decision making such as machine learning and artificial intelligence.

Figure 6:
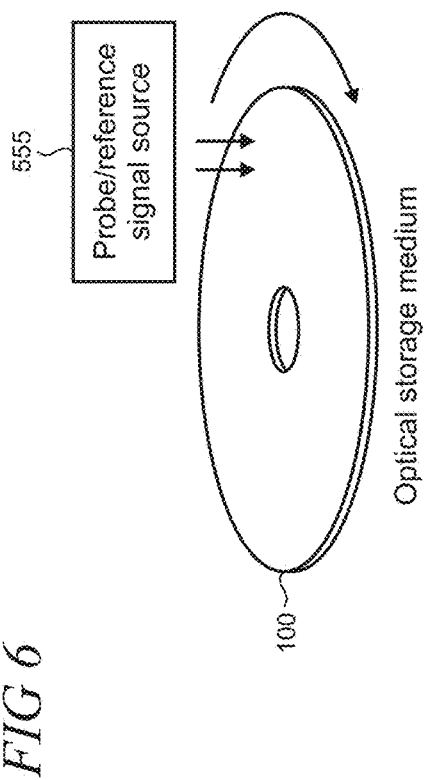
FIG. 6 shows an illustrative alternative form factor for an optical storage medium that is rotated relative to fixedly-located write and read components.

FIG. 6 shows an illustrative alternative circular form factor for the optical storage medium 100 that is rotated using a suitable actuator (not shown) relative to the fixedly-located probe and reference beam signal source 555 (the differential phase voxel reader is not shown in the drawing). In some implementations, either or both the read components and the optical storage medium are configured to be moveable to effectuate position changes relative to each other.

Figure 7:
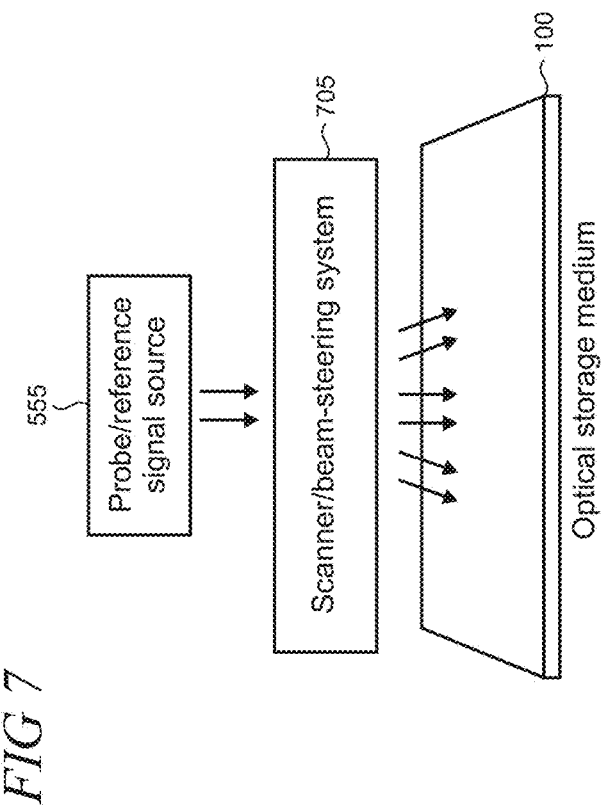
FIG. 7 shows an illustrative arrangement for an optical data reading component in which both a reading component and an optical storage medium are fixedly-located.

In an illustrative alternative embodiment shown in FIG. 7, the reading of voxels from the optical storage medium 100 can utilize a scanner mechanism 705 using, for example, reflective optics and micro-electro-mechanical systems (MEMS). Use of the scanner system may facilitate beam steering of the probe and reference signals from the source 555 to various locations within the volume of the optical storage medium and received at the differential phase voxel reader (not shown). The scanner system may further be configured for use with translational and/or rotational actuators of the reading component and/or optical storage medium to implement relative position changes which may facilitate the voxel reading processes.

Figure 8:
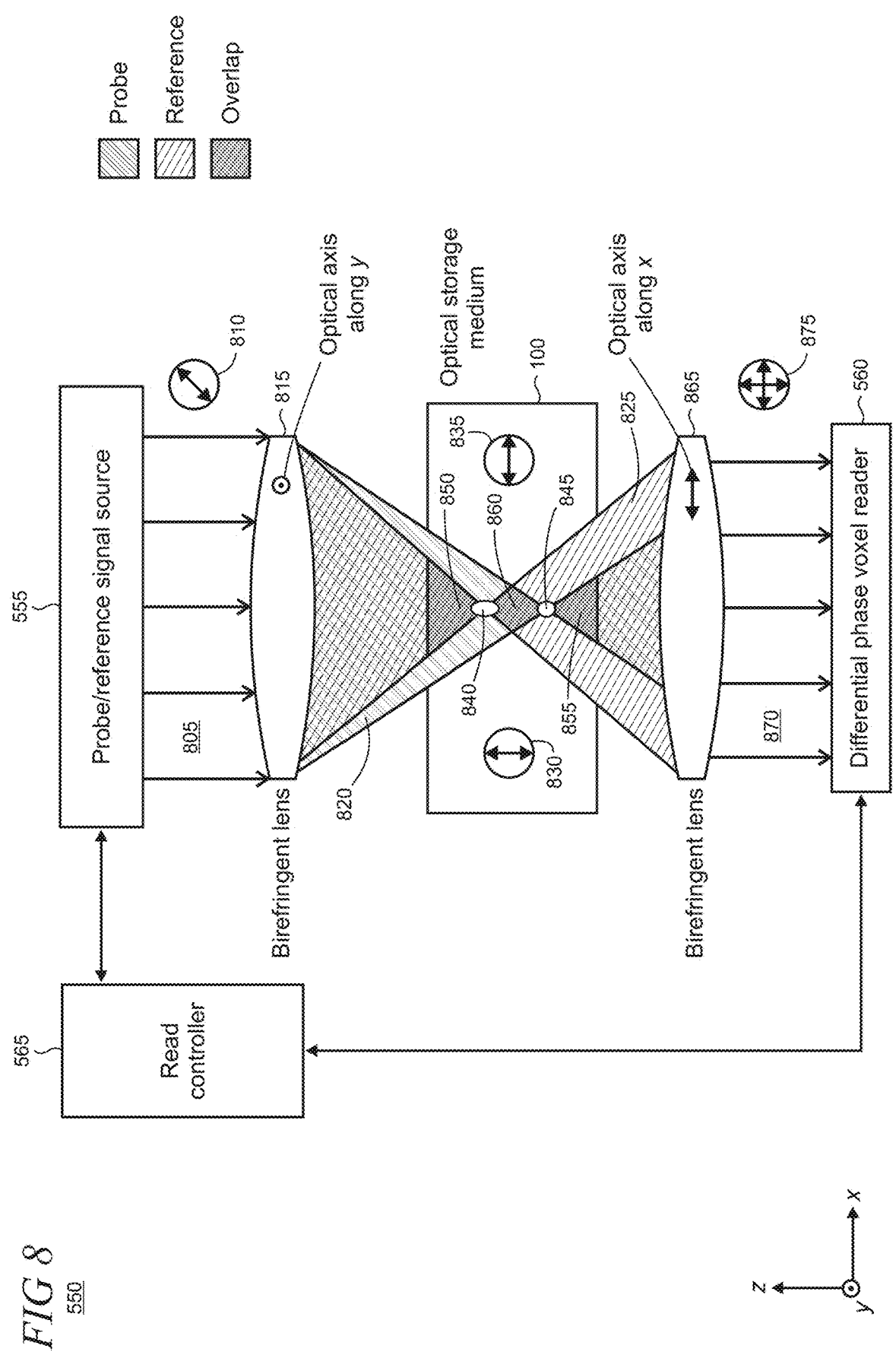
FIG. 8 shows details of a first illustrative example of an optical data read system arranged in accordance with the present principles.

FIG. 8 shows details of a first illustrative example of the optical data read system 550. The signal source 555 generates a collimated beam of light 805 having a state of polarization that is oriented at 45 degrees to an optical axis of a first birefringent lens 815, as indicated by reference numeral 810. It is noted that the arrow within a circle symbol in the drawings indicates that a given polarization state is made with reference to the xy plane that is perpendicular to the direction of light propagation along the z axis.

The first birefringent lens 815 having an optical axis that is oriented along the y axis is positioned at a beam entry side of the optical storage medium 100. The first birefringent lens splits the beam 805 into a separate probe light beam 820 and reference light beam 825 which propagate through the storage medium 100. The beam's respective orthogonally-polarized states are indicated by reference numerals 830 and 835 in the drawing.

In addition to splitting the input into polarized light beams, the first birefringent lens 815 also focuses the probe and reference light beams at varying depths within the optical storage medium 100. Each point of focus—termed the beam "waist"—for the respective probe 820 and reference 825 light beams is at a different location within the three-dimensional volume of the optical storage medium 100. In this illustrative example, the waist for the probe is located at a voxel 840 while the waist for the reference is located at a second nearby voxel 845. As shown, the voxels are located in different layers in the optical storage medium. The layers can be neighboring or non-neighboring in various different scenarios and use cases.

The closeness of the beam waists means that the probe and reference light beams overlap to some extent within the volume of the optical storage medium, as indicated by reference numerals 850, 855 and 860. As shown, the overlapping portions are located above, below, and between the voxels 840 and 845. It may be appreciated that the amount of overlap of the probe and reference light beams between the voxels is greater when the voxels are separated by multiple layers in the optical storage medium 100.

A second birefringent lens 865 having an optical axis that is located along the x axis is positioned at a beam exit side of the optical storage medium. The second birefringent lens re-collimates the probe and reference light beams, as indicated by reference numeral 870, while maintaining their orthogonal polarization states, as indicated by reference numeral 875.

Figure 9:
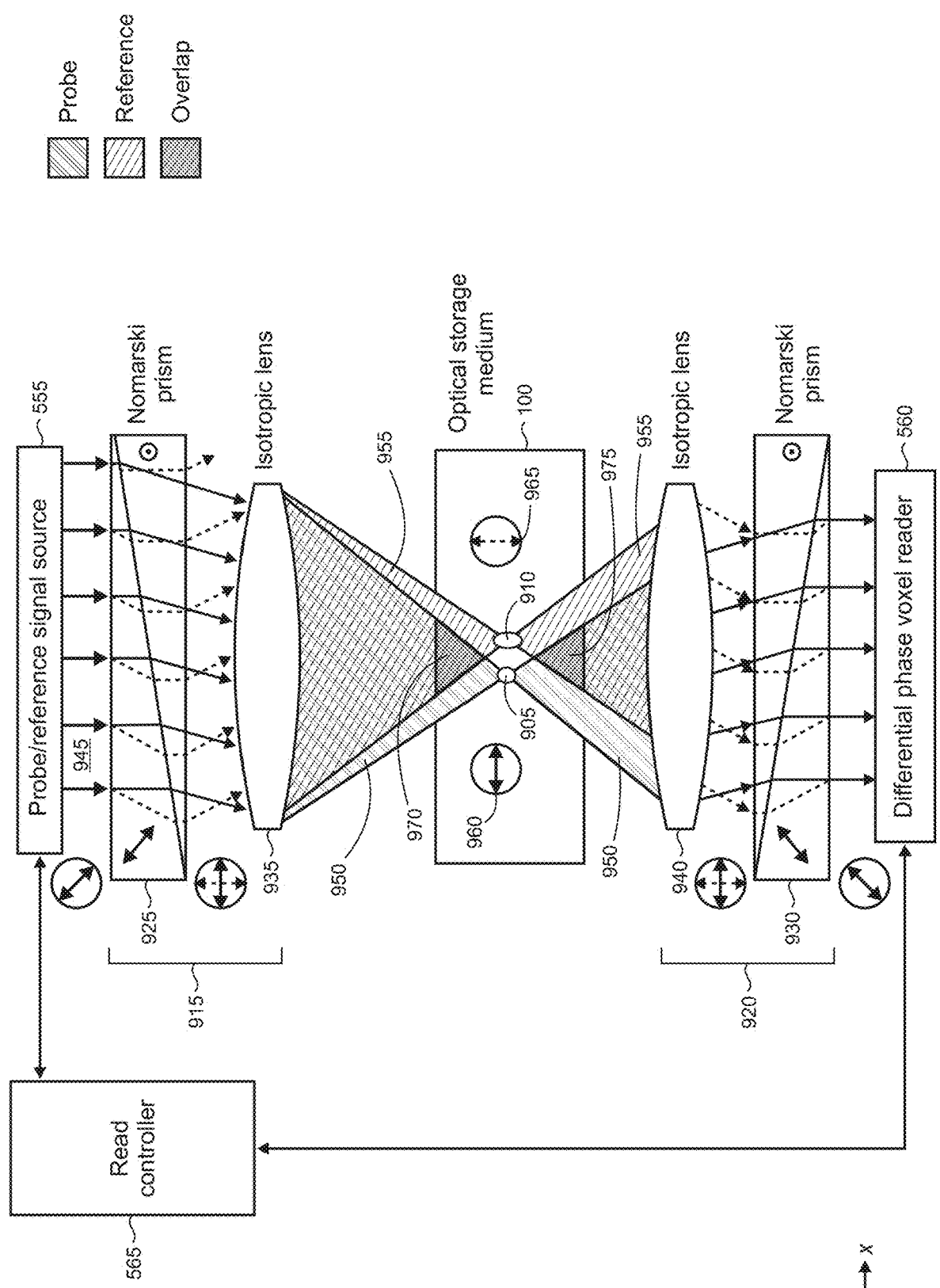
FIG. 9 shows details of a second illustrative example of an optical data read system arranged in accordance with the present principles.

FIG. 9 shows details of a second illustrative example of the optical data read system 550. In this example the voxels of interest, indicated by reference numerals 905 and 910, are located on the same layer and adjacent to one another within the optical storage medium 100. In alternative embodiments, the voxels are located on the same layer while being non-adjacent.

In this illustrative example, optical elements stacked in cascades 915 and 920 are located at the beam entry and exit sides of the optical storage medium 100. The stacked optical elements in each cascade include a Nomarski prism (elements 925 and 930) and an isotropic (i.e., non-birefringent) lens (element 935 and 940). The probe and reference signal source 555 is configured to generate collimated light beam 945 within a relatively narrow angular spectrum spread.

A Nomarski prism is a modification of a Wollaston prism that is commonly used in differential interference contrast (DIC) microscopy. In alternative implementations of the present principles, Wollaston prisms may be utilized instead of Nomarski prisms. Each Normarski prism 925 and 930 comprises two birefringent crystal wedges joined together along their hypotenuses such that the wedge optical axis is oriented obliquely with respect to the flat surfaces of the prism. The Nomarski prisms operate to separate beams having different states of polarization (here, x and y polarizations) and output the lights beams with different angular directions of propagation.

The beams from the first Nomarski prism 925 are focused by the first isotropic lens 935 as probe 950 and reference 955 light beams at the respective separate locations for voxels 905 and 910 within the optical storage medium 100. As indicated by symbols 960 and 965, the polarization states of the probe and reference light beams are orthogonal within the xy plane. The probe and reference light beams overlap in the optical storage medium 100, as indicated by reference numerals 970 and 975. Unlike the illustrative example shown in FIG. 8 and discussed above, there is no overlap of the probe and reference light beams between the voxels.

At the beam exit side of the optical storage medium 100, the second isotropic lens 940 focuses the exiting probe and reference light beams at the second Nomarski prism 930. The second Nomarski prism aligns the propagation directions of the beams and outputs them to the differential phase voxel reader 560 for reading.

Figure 10:
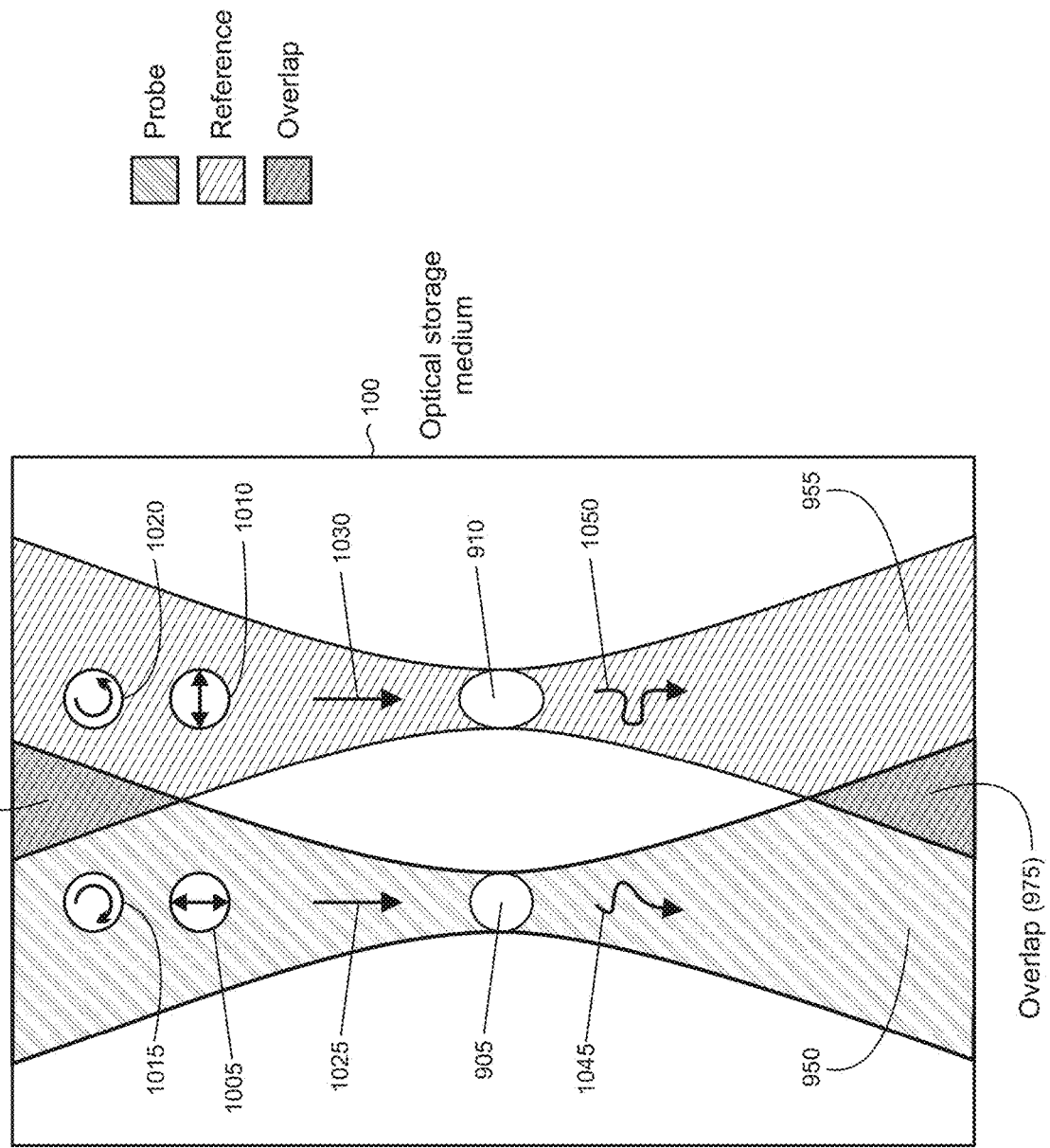
FIG. 10 shows an enlarged view of illustrative probe and reference light beams irradiating a portion of an optical storage medium.

FIG. 10 shows an enlarged view of illustrative probe 950 and reference 955 light beams irradiating a portion of an optical storage medium 100 for the illustrative example of the optical data read system shown in FIG. 9 and discussed above. The orthogonal modes of polarization for the probe and reference light beams include linear polarization (e.g., vertical vs. horizontal states of polarization), as indicated by symbols 1005 and 1010, and circular polarization (e.g., lefthanded circular vs. righthanded circular) as indicated by symbols 1015 and 1020. The probe and reference light beams propagate through the optical storage medium (downwards along the z axis as indicated by arrows 1025 and 1030) and respectively interact with voxels 905 and 910. The interactions with the voxels cause perturbations in the beams that can alter beam properties or characteristics, as indicated by arrows 1045 and 1050, for example, phase, polarization, and/or magnitude.

Figure 12:
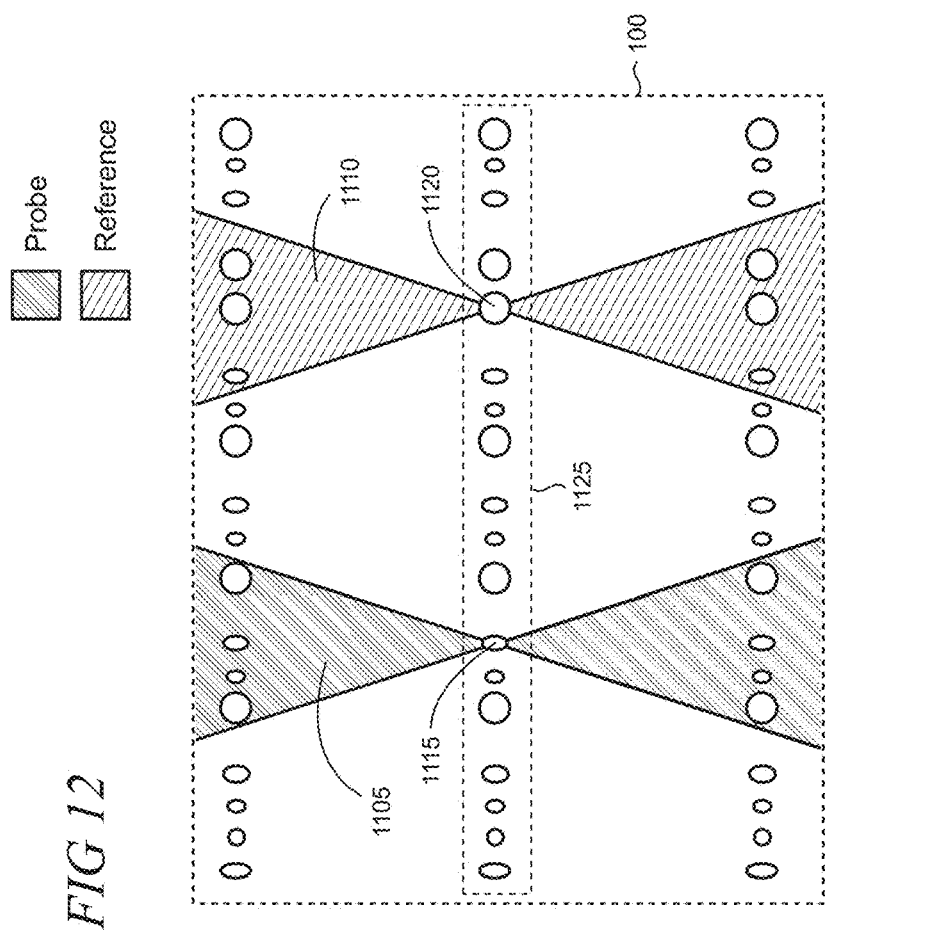
FIG. 12 is an enlarged view of the first set of illustrative beam profiles.
Figure 11:
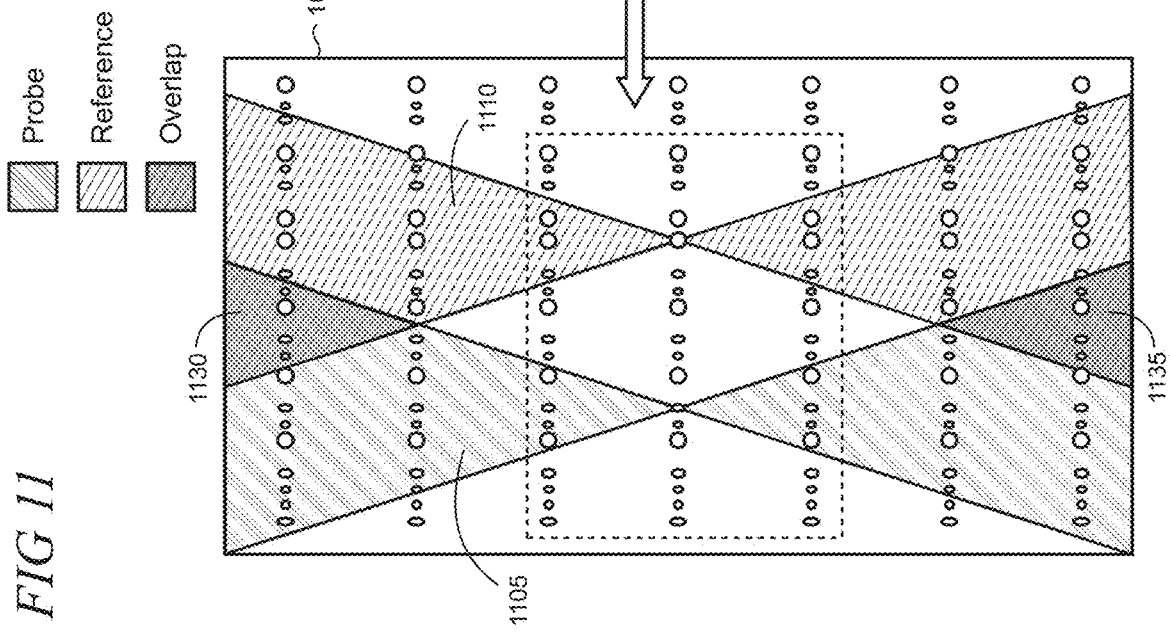
FIG. 11 shows a first set of illustrative beam profiles for the probe and reference light beams.

Different probe and reference light beam arrangements may be alternatively utilized to meet the needs of a given application of the present principles. FIGS. 11 and 12 show a first set of illustrative profiles for the probe 1105 and reference 1110 light beams (FIG. 12 provides an enlarged view). As shown, respective beam waists are located at different voxels 1115 and 1120 in the same layer 1125 within the optical storage medium 100. The probe and reference light beams overlap, as indicated by reference numerals 1130 and 1135, which mitigates some of the perturbations caused by the light scattering in the optical storage medium from the layers of voxels.

FIGS. 13 and 14 show a second set of illustrative beam profiles for probe 1305 and reference 1310 light beams (FIG. 14 provides an enlarged view). In this illustrative example, the waist of the probe light beam is located at a voxel 1315 while the waist of the reference light beam is focused at a location 1320 within the volume of the optical storage medium 100, but is not focused at any particular voxel. The probe and reference light beams overlap, as indicated by reference numerals 1325 and 1330, which mitigates some of the impairments caused by the light scattering in the optical storage medium.

Figure 16:
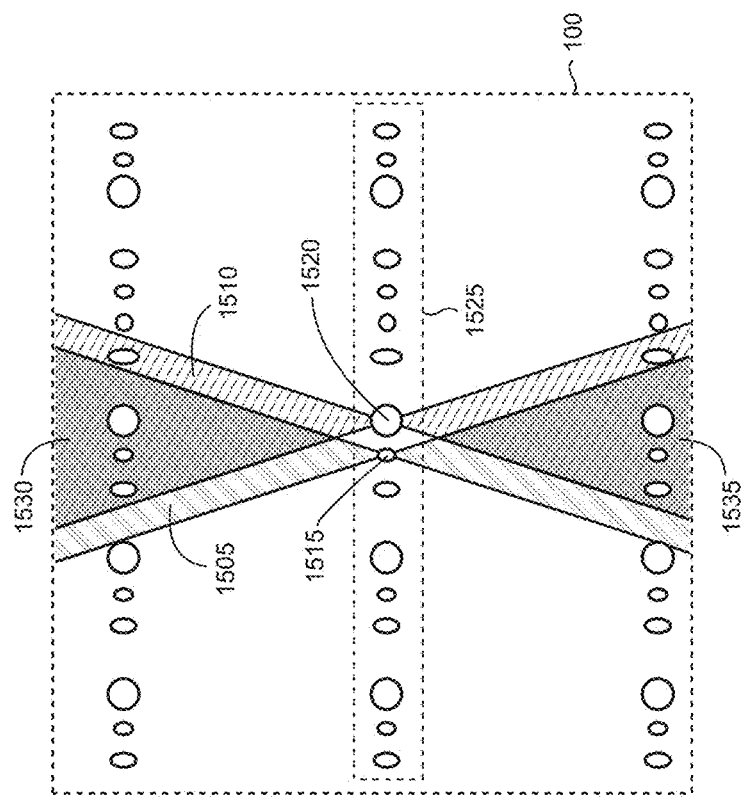
FIG. 16 is an enlarged view of the third set of illustrative beam profiles.
Figure 15:
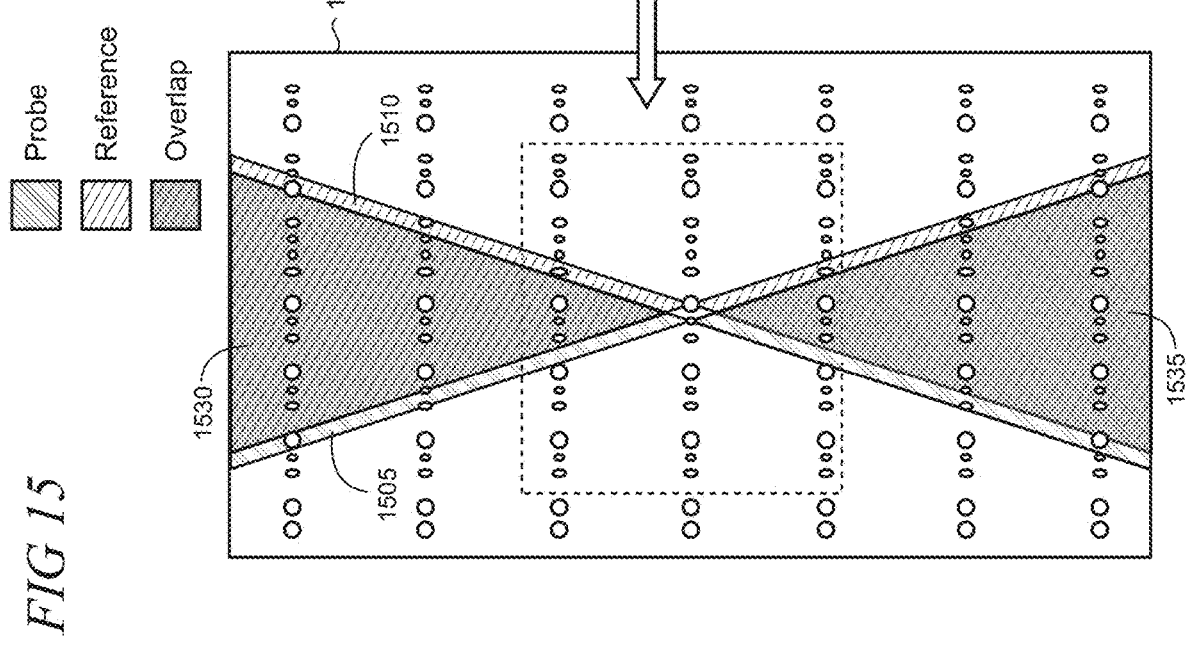
FIG. 15 shows a third set of illustrative beam profiles for the probe and reference light beams.

FIGS. 15 and 16 show a third set of illustrative beam profiles for probe 1505 and reference 1510 light beams (FIG. 16 provides an enlarged view). In this illustrative example, the waist of the probe light beam is focused on a voxel 1515 while the waist of the reference light beam is focused on a voxel 1520 that is immediately adjacent to the voxel 1515 in the same voxel layer 1525. The probe and reference light beams have substantial overlap, as indicated by reference numerals 1530 and 1535.

The large degree of overlap between the probe 1505 and reference 1510 light beams in the illustrative example shown in FIGS. 15 and 16 provides a close analog to conventional DPSK-types of modulation used in fiber optic telecommunications systems. Telecommunication applications determine symbol values by detecting changes in phase between consecutive symbols in the time domain to thereby provide robust data transmission. In contrast, the present voxel reading techniques detect differences between the symbols in the spatial domain. While reading the adjacent voxels, the probe and reference light beams must propagate through approximately the same volume and therefore experience the same phase perturbations. Using differential encoding techniques, the phase perturbations will largely be cancelled to provide a near-optimal SNR condition at the differential phase voxel reader 560 (FIG. 5) and make voxel reading less prone to errors.

Figure 19:
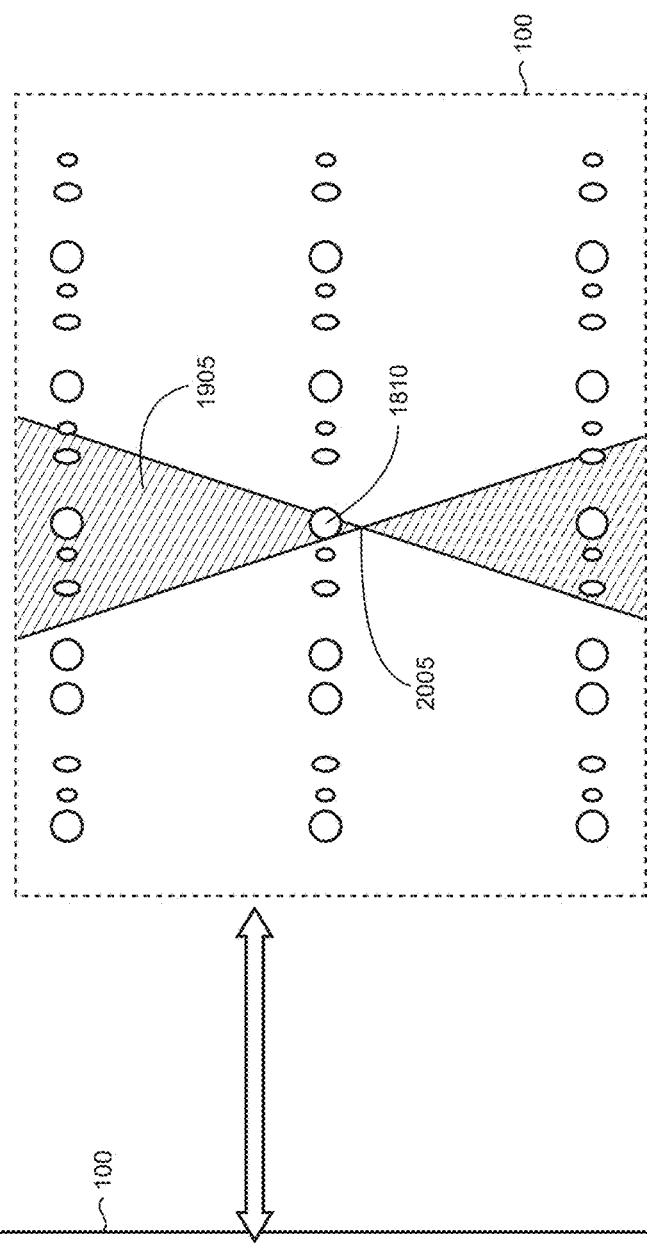
FIG. 19 shows a fourth illustrative beam profile for only the reference light beam.
Figure 20:
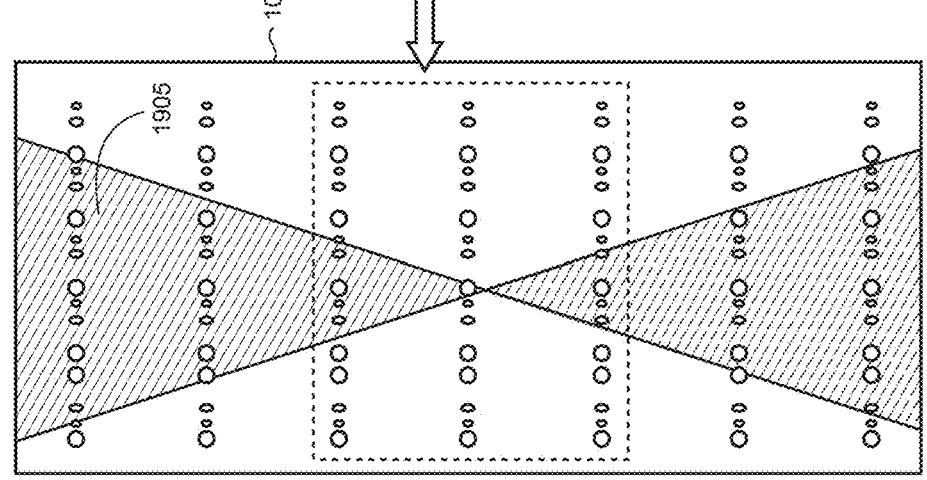
FIG. 20 shows an enlarged view of the fourth illustrative beam profile for only the reference light beam.

FIGS. 17-22 show a fourth set of illustrative beam profiles for probe and reference light beams in which the beams are focused above and below the same voxel. For clarity in exposition, FIGS. 17 and 18 show the fourth illustrative beam profile for only the probe light beam 1705 and FIGS. 19 and 20 show the fourth illustrative beam profile for only the reference light beam 1905 (FIGS. 18 and 20 provide enlarged views).

As shown in FIGS. 17 and 18, the waist of the probe light beam 1705 is focused at a location 1805 within the volume of the optical storage medium 100 that is slightly above a voxel 1810. As shown in FIGS. 19 and 20, the waist of the reference light beam 1905 is focused at a location 2005 within the volume of the optical storage medium 100 that is slightly below the voxel 1810.

FIGS. 21 and 22 show the fourth set of illustrative beam profiles for the combined probe 1705 and reference 1905 light beams focused near the same voxel 1810. The self-referencing approach utilized with the fourth set of beam profiles provides the greatest amount of overlap of the propagation paths of the beams. However, the approach works if (and only if) the probe and reference light beams experience phase changes of opposing signs.

Figure 23:
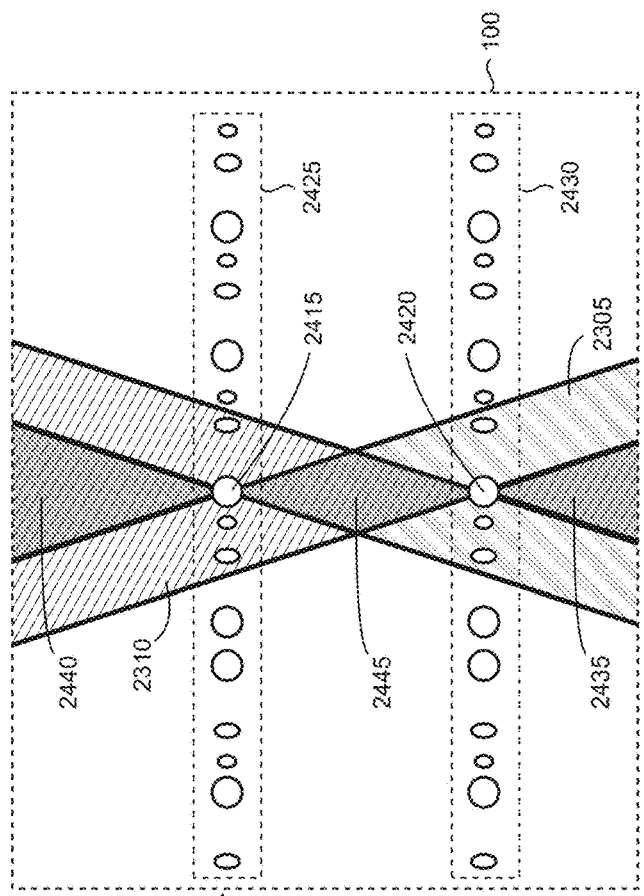
FIG. 23 shows a fifth set of illustrative beam profiles for the probe and reference light beams.
Figure 24:
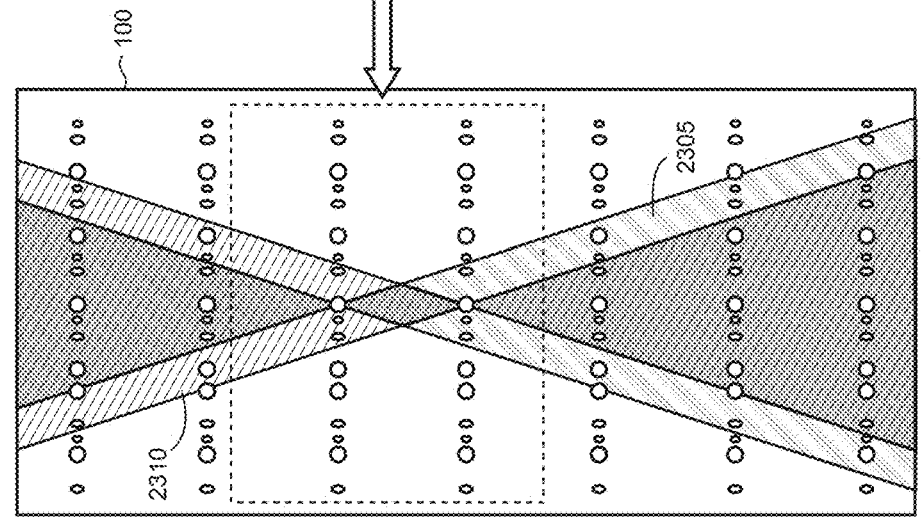
FIG. 24 is an enlarged view of the fifth set of illustrative beam profiles.

FIGS. 23 and 24 show a fifth set of illustrative beam profiles for probe 2305 and reference 2310 light beams (FIG. 24 provides an enlarged view). In this illustrative example, the waist of the probe light beam is focused on a voxel 2415 while the waist of the reference light beam is focused on a voxel 2420 that is located below voxel 2415 in the optical storage medium 100. The voxels 2415 and 2420 are located in different voxel layers of the optical storage medium such that voxel 2415 is located in voxel layer 2425 and voxel 2420 is located in voxel layer 2430. It is noted that the points of focus of the probe and reference lights beams may be switched such that the probe light beam is focused on a voxel in the lower layer 2430 and the reference light beam is focused on a voxel in the upper layer 2425.

While the drawing shows the voxels 2415 and 2420 being in immediately adjacent layers in this particular illustrative embodiment, the voxels 2415 and 2420 may be separated by multiple voxel layers in the optical storage medium 100 in some cases. The probe and reference light beams overlap in some areas of the optical storage medium, as indicated by reference numerals 2435 and 2440. In addition, another area of overlap 2445 for the probe and reference light beams is located between the voxels 2415 and 2420. The amount of overlap of the probe and reference light beams between the voxels is greater when the voxels are separated by multiple layers in the optical storage medium.

Figure 25:
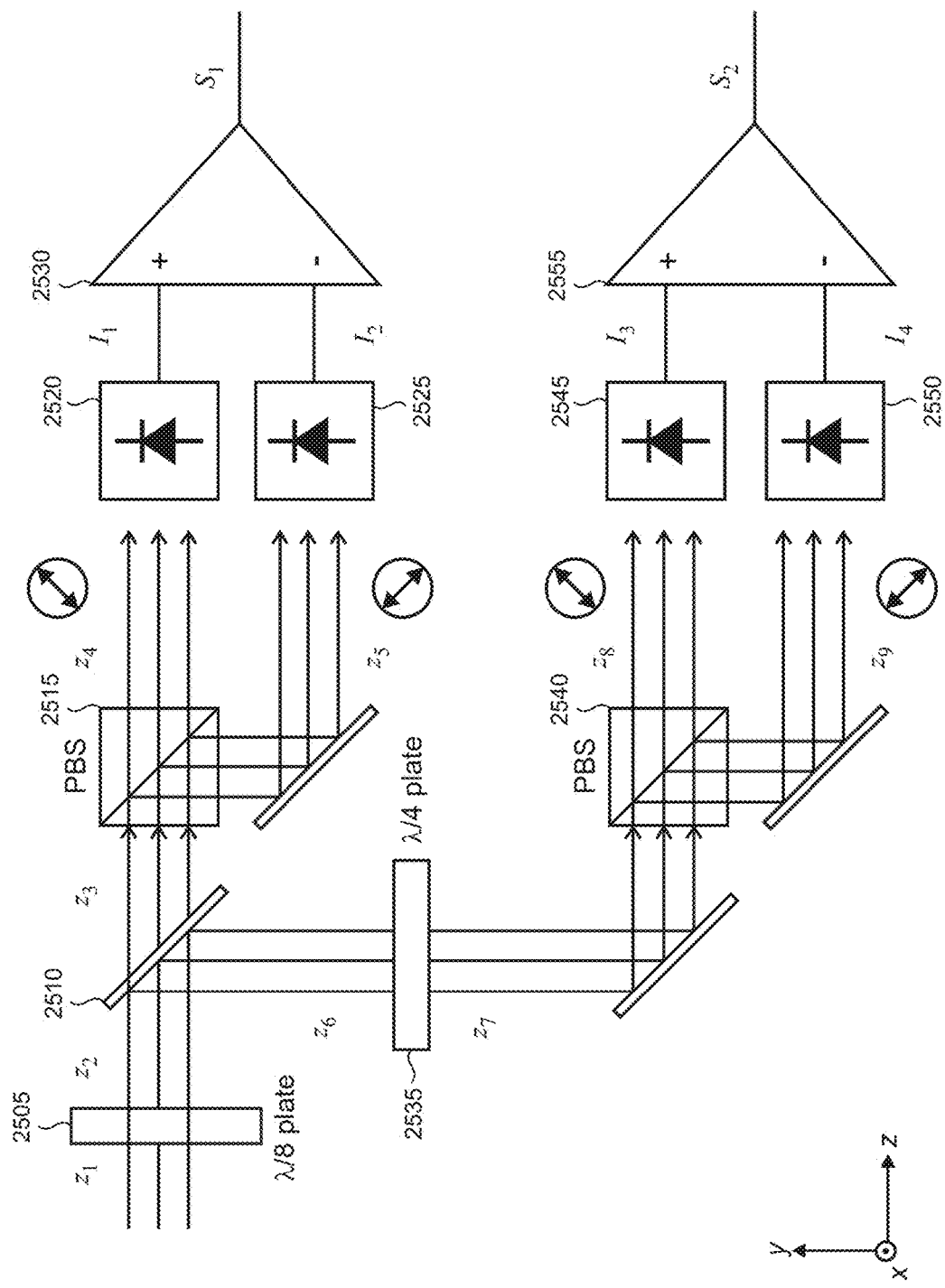
FIG. 25 shows an arrangement for an illustrative differential phase voxel reader for DQPSK-type encoding that determines symbol values in which a symbol has four possible phase values.

FIG. 25 shows an arrangement for the illustrative differential phase voxel reader 560 for DQPSK-type encoding that determines symbol values for voxels in the optical storage medium 100 (FIG. 1). The following mathematical derivation for the output of the reader is based on the set of beam profiles shown in FIGS. 15 and 16 and described in the accompanying text in which the probe 1505 and reference 1510 light beams are focused at adjacent voxels 1515 and 1520 in a shared voxel layer 1525 in the optical storage medium 100.

The input to the differential phase voxel reader 560 is a Jones vector $$z_1 = \begin{pmatrix} x \\ y \end{pmatrix} = \begin{pmatrix} ae^{i\phi} \\ be^{i\theta} \end{pmatrix},$$

where slowly-varying electric field amplitudes $x=ae^{i\phi}$ and $y=be^{i\theta}$ correspond to the probe 1505 and reference 1510 beams of FIG. 15, respectively, and where a, b, $\phi$, $\theta \in \mathbb{R}$. The light is coupled with a $\lambda/8$-retarder plate 2505 that shifts the y polarization state by $-45$ degrees to give $$z_2 = \begin{pmatrix} 1 & 0 \\ 0 & e^{-i\pi/4} \end{pmatrix} z_1 = \begin{pmatrix} ae^{i\phi} \\ be^{i(\theta-\pi/4)} \end{pmatrix}.$$

The beam is split by a non-polarizing half-reflecting mirror 2510 to fields $z_3=z_2$ and $z_6=z_2$ for respective upper and lower paths through the reader. The $1/\sqrt{2}$ coefficients are omitted because the field phases, and not the amplitudes, are of interest. The upper path beam $z_3$ is directed to a polarizing beam splitter (PBS) cube 2515 that is oriented to an azimuth of 45 degrees to the x polarization basis vector. Therefore, the two outputs of the PBS cube have an equal amount of contribution from the x and y polarized fields $$z_4 = \begin{pmatrix} 1 & 1 \\ 1 & 1 \end{pmatrix} z_3 = \frac{1}{2} = \begin{pmatrix} ae^{i\phi} + ibe^{i(\theta-\pi/4)} \\ ae^{i\phi} + ibe^{i(\theta-\pi/4)} \end{pmatrix}$$

$$z_5 = \begin{pmatrix} 1 & -1 \\ -1 & 1 \end{pmatrix} z_3 = \frac{1}{2} \begin{pmatrix} ae^{i\phi} - ibe^{i(\theta-\pi/4)} \\ -ae^{i\phi} + ibe^{i(\theta-\pi/4)} \end{pmatrix}$$

that gives the following intensities at the photodetectors 2520 and 2525 (factors of ½ omitted)

$$I_1 = z_4 z^*_4 = a^2 + b^2 + \sqrt{2}\ ab\ \cos(\phi-\theta) - \sqrt{2}\ ab\ \sin(\phi-\theta)$$

$$I_2 = z_5 z^*_5 = a^2 + b^2 + \sqrt{2}\ ab\ \cos(\phi-\theta) - \sqrt{2}\ ab\ \sin(\phi-\theta)$$

and (omitting constant coefficients again) the difference signal produced by the differential amplifier 2530 is $$S_1 = ab\cos\left(\phi - \theta + \frac{\pi}{4}\right).$$

Deriving the equations in a similar manner for the lower path, the beam $z_6$ is coupled with a $\lambda/4$-retarder 2535 that shifts the y polarization state $$z_7 = \begin{pmatrix} 1 & 0 \\ 0 & e^{i\pi/2} \end{pmatrix} z_6 = \begin{pmatrix} ae^{i\phi} \\ ibe^{i(\theta-\pi/4)} \end{pmatrix}$$

and after splitting with the lower path PBS cube 2540

$$z_8 = \begin{pmatrix} 1 & 1 \\ 1 & 1 \end{pmatrix} z_7 = \frac{1}{2} = \begin{pmatrix} ae^{i\phi} + ibe^{i(\theta-\pi/4)} \\ ae^{i\phi} + ibe^{i(\theta-\pi/4)} \end{pmatrix}$$

$$z_9 = \begin{pmatrix} 1 & -1 \\ -1 & 1 \end{pmatrix} z_7 = \frac{1}{2}\begin{pmatrix} ae^{i\phi} - ibe^{i(\theta-\pi/4)} \\ -ae^{i\phi} + ibe^{i(\theta-\pi/4)} \end{pmatrix}$$

that gives intensities at the lower path photodetectors 2545 and 2550 (factors of ½ omitted)

$$I_3 = a^2 + b^2 + \sqrt{2}\ ab\ \cos(\phi-\theta) + \sqrt{2}\ ab\ \sin(\phi-\theta)$$

$$I_4 = a^2 + b^2 + \sqrt{2}\ ab\ \cos(\phi-\theta) + \sqrt{2}\ ab\ \sin(\phi-\theta)$$

and their difference signal (constant coefficients omitted) at the differential amplifier 2555 is $$S_2 = ab\sin\left(\phi - \theta + \frac{\pi}{4}\right).$$

As evident from the preceding discussion, the received intensities $I_1$, $I_2$, $I_3$, $I_4$ and the difference signals $S_1$ and $S_2$ depend on the phase difference ($\phi-\theta$). The probe 1505 and the reference 1510 light beams, their associated polarization modes, and the respective phases ($\phi$, $\theta$), accumulate phase error that is the same or nearly the same while traveling through the light-scattering optical storage medium 100. Mathematically, the phases may be expressed as $$\phi = \phi' + \epsilon_\phi$$

$$\theta = \theta' + \epsilon_\theta$$

where $\phi'$, $\theta'$ signify idealized unperturbed phases and $\epsilon_\phi \approx \phi_\theta$ account for the accumulated phase errors. Thus, the accumulated phase errors will largely be canceled from the received intensities $I_1$, $I_2$, $I_3$, $I_4$ and the difference signals $S_1$ and $S_2$. In addition, the difference $S_1$, $S_2$ improves the SNR similarly to the well-tested differential phase-shift keying methodology used in telecommunications.

Figure 27:
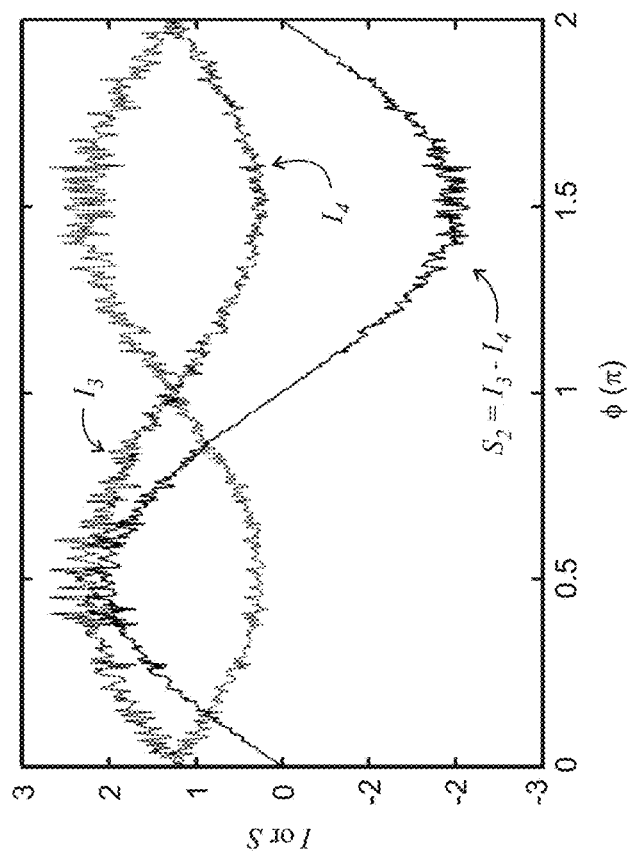
FIGS. 26 and 27 are plots of difference signals $S_1$ and $S_2$ produced by respective differential amplifiers.
Figure 26:
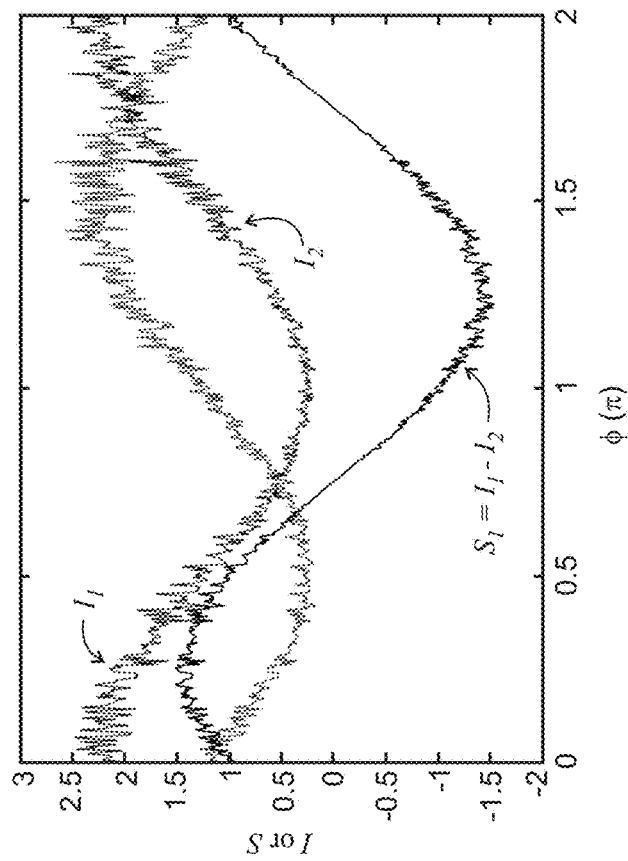

FIG. 26 is a plot 2600 showing the received intensity signals, $I_1$ and $I_2$, and the difference signal $S_1$ after comparison. FIG. 27 is a plot 2700 showing the received intensity signals, $I_3$ and $I_4$, and the difference signal $S_2$ after comparison. In both plots, noise is added to amplitude a (i.e., a=1+noise). The values of a and b are different (i.e., b=0.5), and the phase is constant (i.e., $\theta=\pi/4$). As shown, the intensity signals $I_1$, $I_2$, $I_3$, and $I_4$ are noisy with significant offset. The difference signals $S_1$ and $S_2$ advantageously remove the offset and improve SNR by decreasing the ripple with respect to the signal magnitude.

Figure 29:
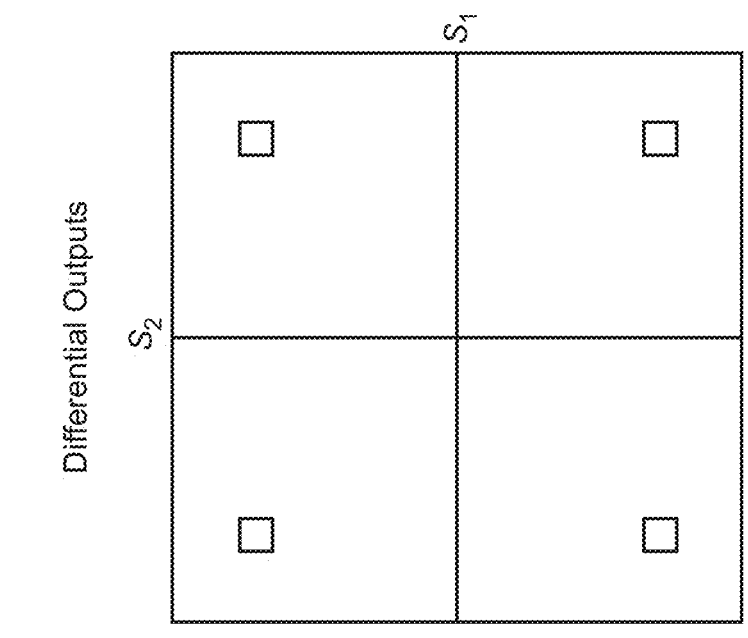
FIG. 29 shows an illustrative constellation of difference signal outputs of the differential phase voxel reader shown in FIG. 25.
Figure 28:
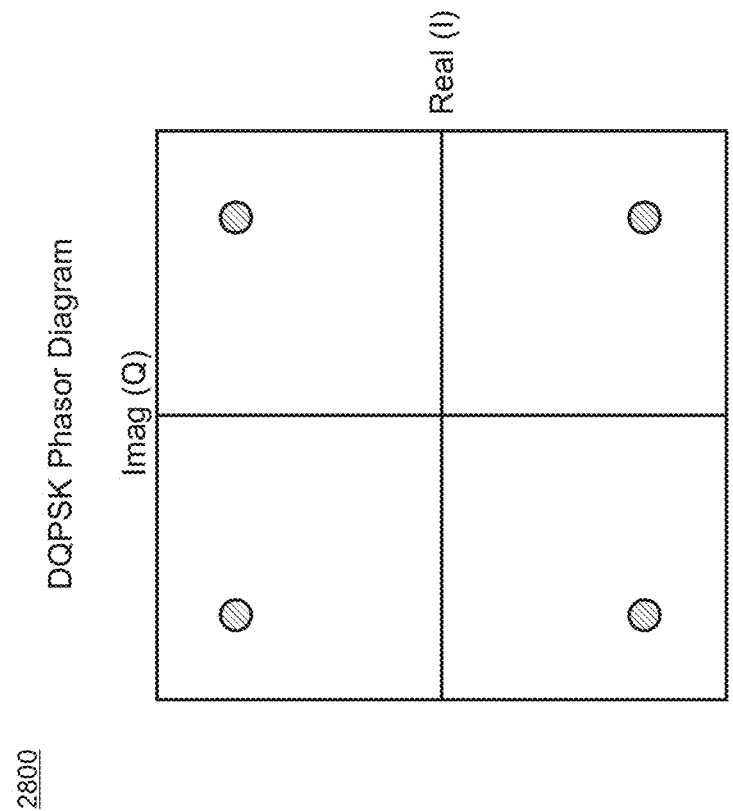
FIG. 28 is an illustrative DQPSK phasor diagram.

As shown in the DQPSK phasor diagram 2800 in FIG. 28, a symbol for the voxel 1515 that is the input to the reader 560 has four possible values in which the phases are distributed evenly (e.g., (+45°, +135°, −135°, −45°) with signal amplitudes having the same value (e.g., 1). FIG. 29 shows the corresponding difference signal constellation 2900 in which voxel 1515 (i.e., the input) has a constant value (e.g., a=1, $\phi$=+45°) and voxel 1520 (i.e., the reference) has all possible values.

Amplitudes (a, b) and phases ($\phi$, $\theta$) of the two adjacent voxels 1515 and 1520 and their difference signals ($S_1$, $S_2$) are shown in the Table below (at decision threshold zero the positive sign refers to bit value of 1 and the negative sign refers to bit value of 0):

| Voxel 1 | | Voxel 2 | | Diff. | Difference signals | |
|---|---|---|---|---|---|---|
| $\phi$ | | $\theta$ | | phase | | |
| α | (deg) | (rad) | b | (deg) | (rad) | $\phi - \theta$ (rad) | $S_1$ | $S_2$ |
| 1 | 45 | 0.79 | 1 | 45 | 0.79 | 0.0 | ±1.4 | ±1.4 |
| 1 | 135 | 2.36 | 1 | 45 | 0.79 | 1.6 | −1.4 | ±1.4 |
| 1 | −135 | −2.36 | 1 | 45 | 0.79 | −3.1 | −1.4 | −1.4 |
| 1 | −45 | −0.79 | 1 | 45 | 0.79 | −1.6 | ±1.4 | −1.4 |

Figure 31:
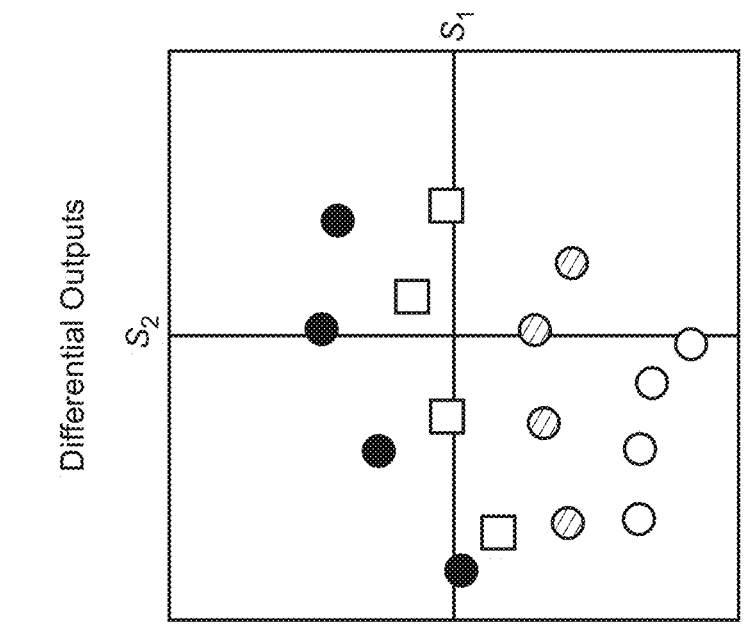
FIG. 31 shows an illustrative constellation of difference signal outputs showing asymmetry due to imperfect voxel encoding.
Figure 30:
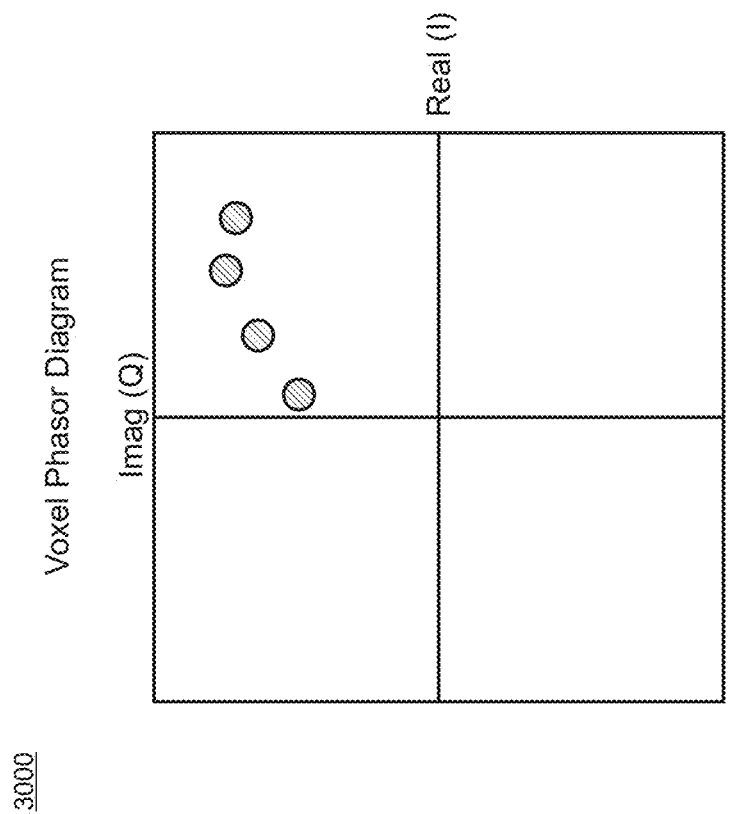
FIG. 30 is an illustrative voxel phasor diagram in which voxels are imperfectly encoded.

Voxels in the optical storage medium 100 may have imperfect encoding in some cases. FIG. 30 shows a voxel phasor diagram 3000 for the input voxel 1510 in which a=(1, 0.9, 0.7, 0.5) and corresponding phases $\phi$=(45°, 55°, 65°, 80°). FIG. 31 shows a corresponding difference signal constellation 3100 in which the reference voxel 1515 has all possible values, i.e., b=(1, 0.9, 0.7, 0.5) and corresponding phases $\theta$=(45°, 55°, 65°, 80°).

Figure 33:
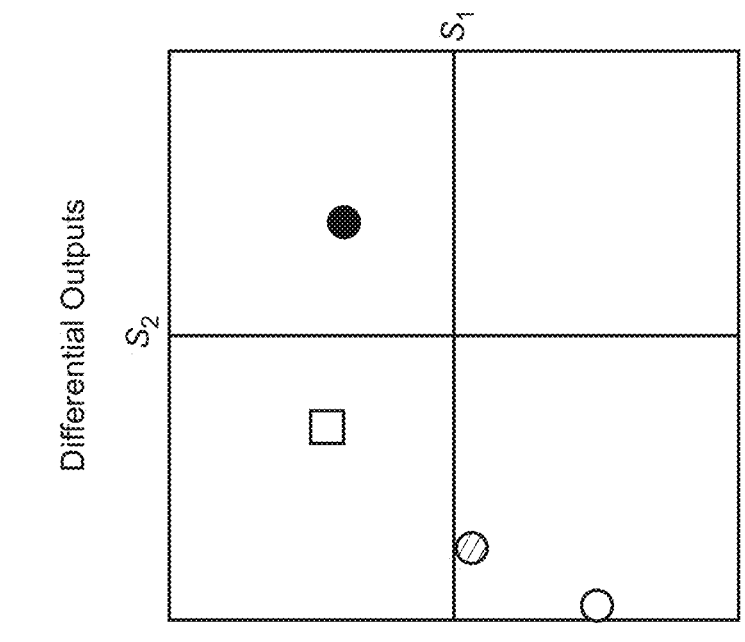
FIG. 33 shows an illustrative constellation of difference signal outputs for the single voxel self-referencing scenario shown in FIG. 32.
Figure 32:
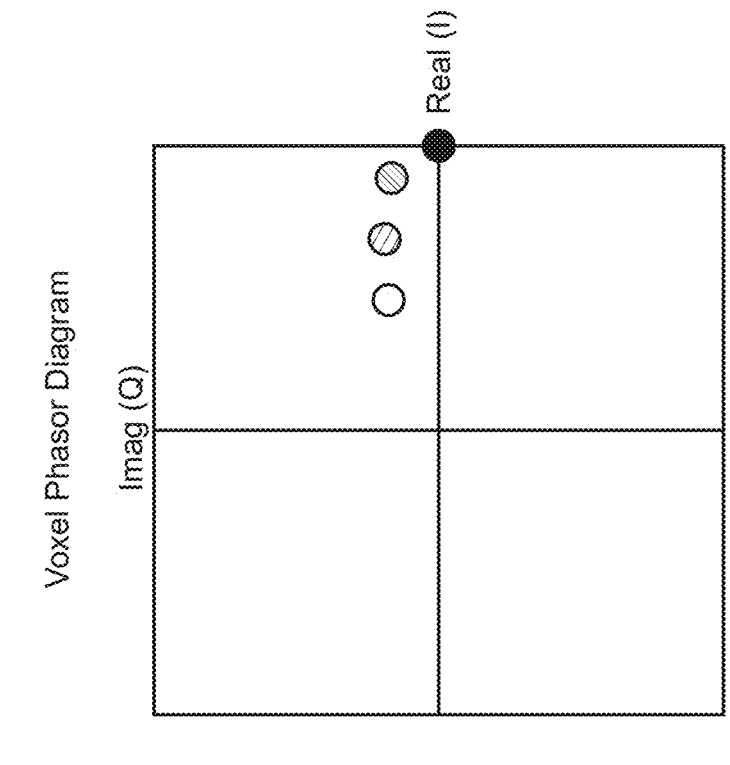
FIG. 32 shows an illustrative voxel phasor diagram in which a single voxel is utilized in a self-referencing scenario.

For the self-referencing voxel encoding shown in FIGS. 17-22 and described in the accompanying text, the reference signal is the same than the probe, but with opposing phase. FIG. 32 shows a voxel phasor diagram 3200 for an input voxel where the amplitude a=(1, 0.9, 0.7, 0.5) and corresponding phases $\phi$=(±10°, ±15°, ±20°, ±25°) while b=(1, 0.9, 0.7, 0.5) and corresponding phases $\theta$=(∓10°, ∓15°, ∓20°, ∓25°). FIG. 33 shows a corresponding difference signal constellation 3300 that is reduced to only four values. This reduction may make voxel reading less prone to errors in some scenarios.

Figure 34:
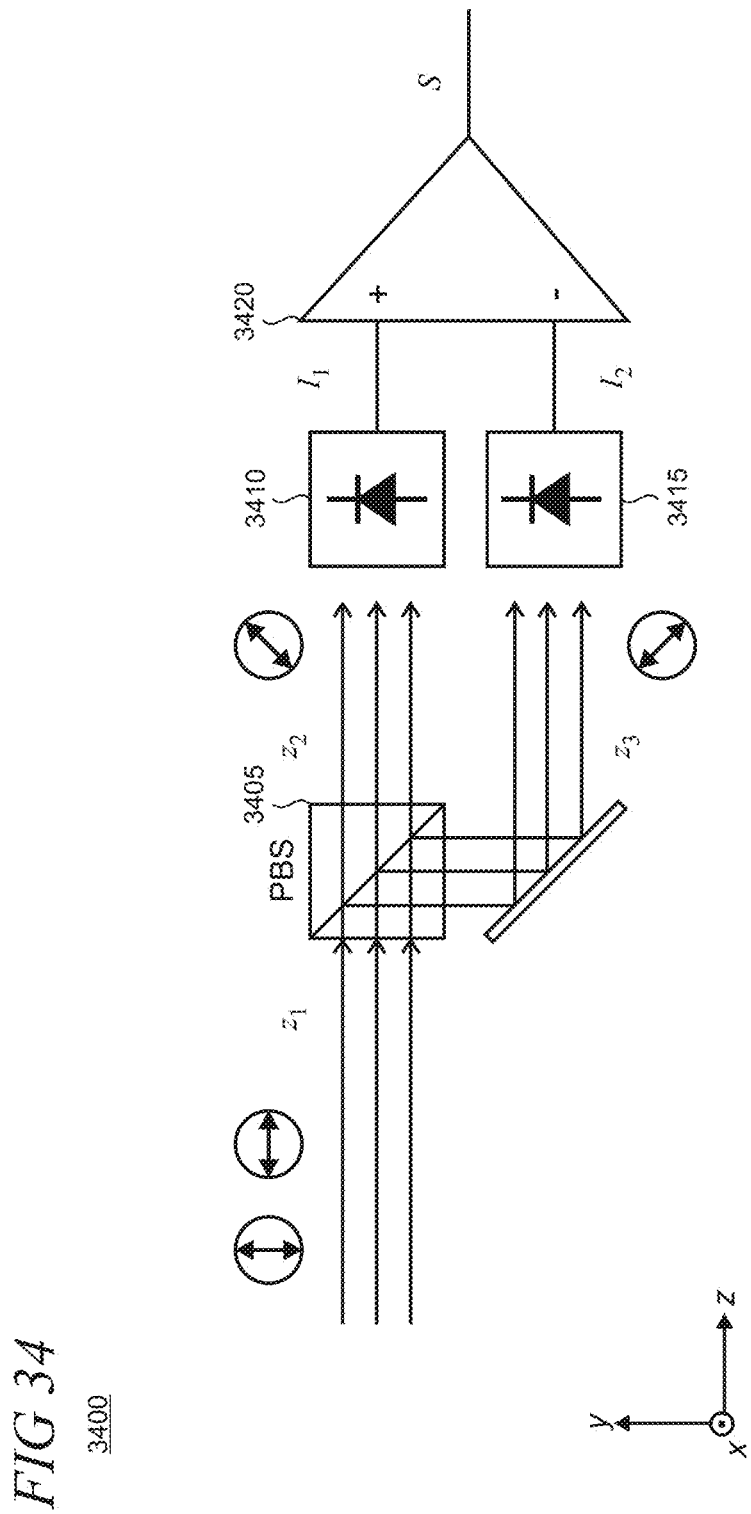
FIG. 34 shows an arrangement for an illustrative differential phase voxel reader that determines symbol values for DPSK-type (differential phase shift keying) encoding, in which a symbol has two possible phase values.
Figure 35:
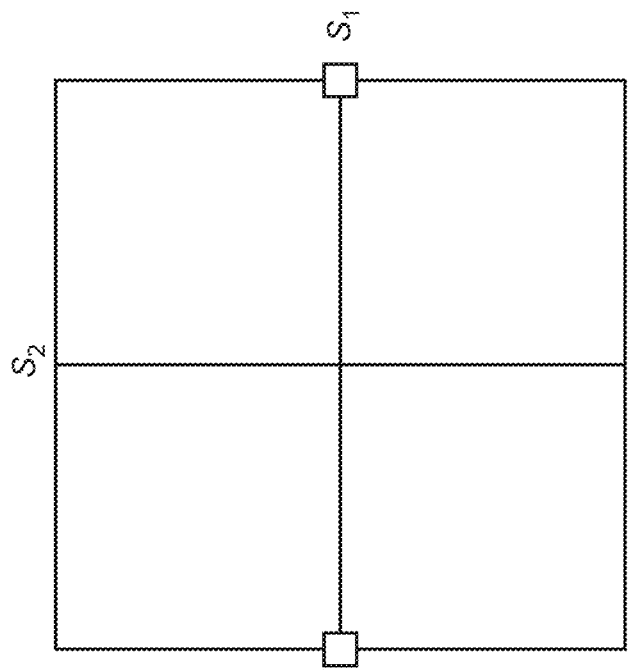
FIG. 35 shows an illustrative constellation of difference signal outputs of the differential phase voxel reader shown in FIG. 34.

FIG. 34 shows an arrangement for an illustrative differential phase voxel reader 3400 that determines symbol values in use cases, for example, involving DPSK-type (differential phase shift keying) encoding. In DPSK, symbols have two possible phase values as shown in the difference signal constellation 3500 in FIG. 35. The differential phase voxel reader using DPSK is more simple compared to the DQPSK-based reader 560 shown in FIG. 25 and described above.

As shown in FIG. 34, a single PBS cube 3405 splits the input $z_1$ to the differential phase voxel reader 3400. The PBS cube is aligned so that the PBS outputs, $z_2$ and $z_3$, have equal contributions from the probe and the reference light beams. Photodetectors 3410 and 3415 convert the optical signal into electrical signals representing intensities as inputs to a single differential amplifier 3420.

The differential phase voxel reader 3400 has characteristics that may be advantageously utilized over its DQPSK-based counterpart in some applications as it is easier to implement with fewer components while providing a higher degree of robustness against signal degradation and noise. In particular, the DPSK-type encoding can be expected to provide easier mitigation against imperfect/asymmetric encoding of the input voxel, as illustratively shown in FIG. 30 and discussed above.

Figure 36:
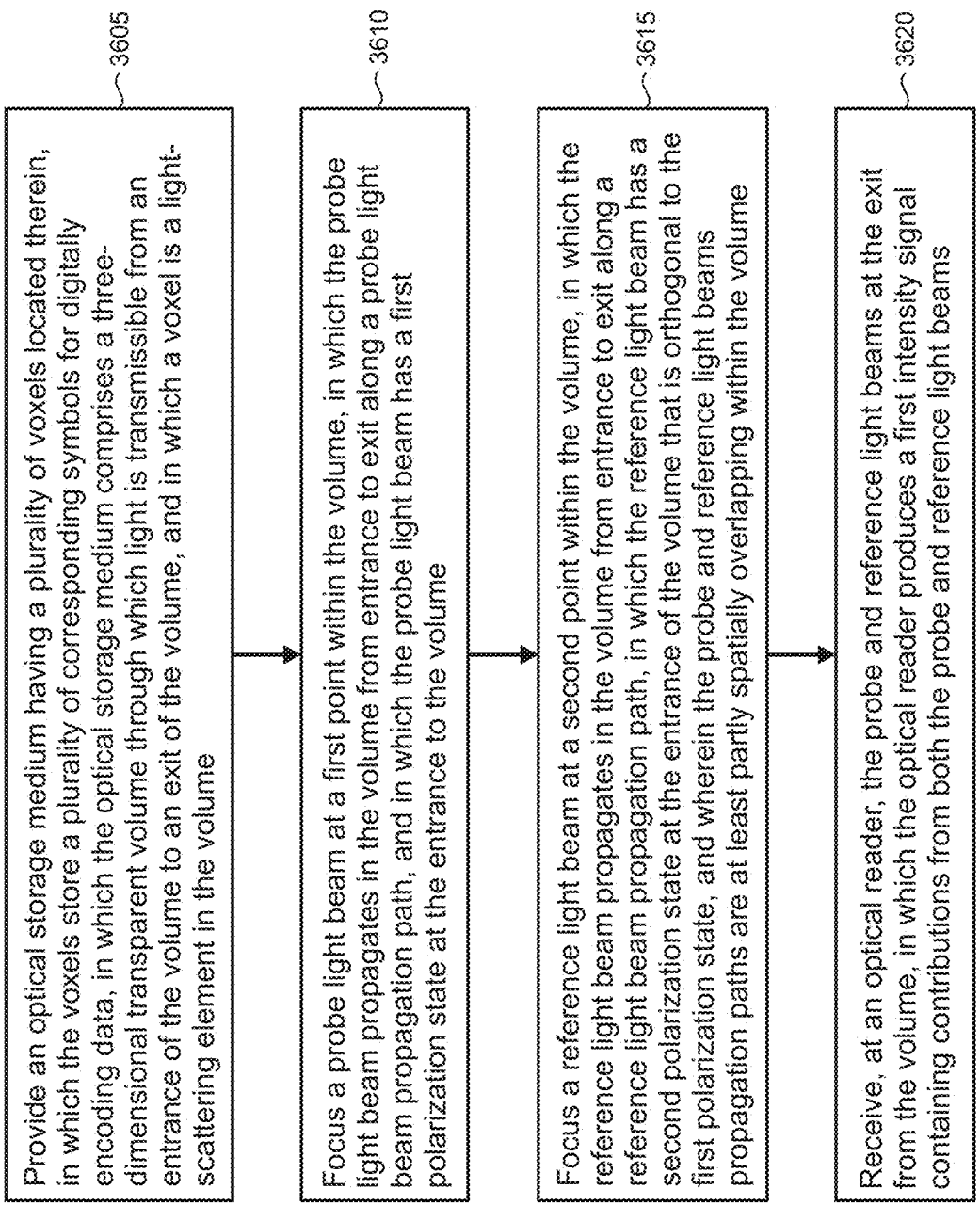
FIGS. 36 and 37 are flowcharts of illustrative methods that are facilitated using the present principles.

FIG. 36 is a flowchart of an illustrative method 3600 for optically reading data from an optical storage medium that may be implemented using a voxel reader arranged using the present principles. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 3605 includes providing an optical storage medium having a plurality of voxels located therein, in which the voxels store a plurality of corresponding symbols for digitally encoding data, in which the optical storage medium comprises a three-dimensional transparent volume through which light is transmissible from an entrance of the volume to an exit of the volume, and in which a voxel is a light-scattering element in the volume.

Block 3610 includes focusing a probe light beam at a first point within the volume, in which the probe light beam propagates in the volume from entrance to exit along a probe light beam propagation path, and in which the probe light beam has a first polarization state at the entrance to the volume.

Block 3615 includes focusing a reference light beam at a second point within the volume, in which the reference light beam propagates in the volume from entrance to exit along a reference light beam propagation path, in which the reference light beam has a second polarization state at the entrance of the volume that is orthogonal to the first polarization state, and wherein the probe and reference light beams propagation paths are at least partly spatially overlapping within the volume.

Block 3620 includes receiving, at an optical reader, the probe and reference light beams at the exit from the volume, in which the optical reader produces a first intensity signal containing contributions from both the probe and reference light beams. Optionally, the optical reader produces a second intensity signal containing contributions from both the probe light beam and a portion of the reference light beam. The first intensity signal can be compared to the second intensity signal to determine a symbol value for a voxel.

Figure 37:
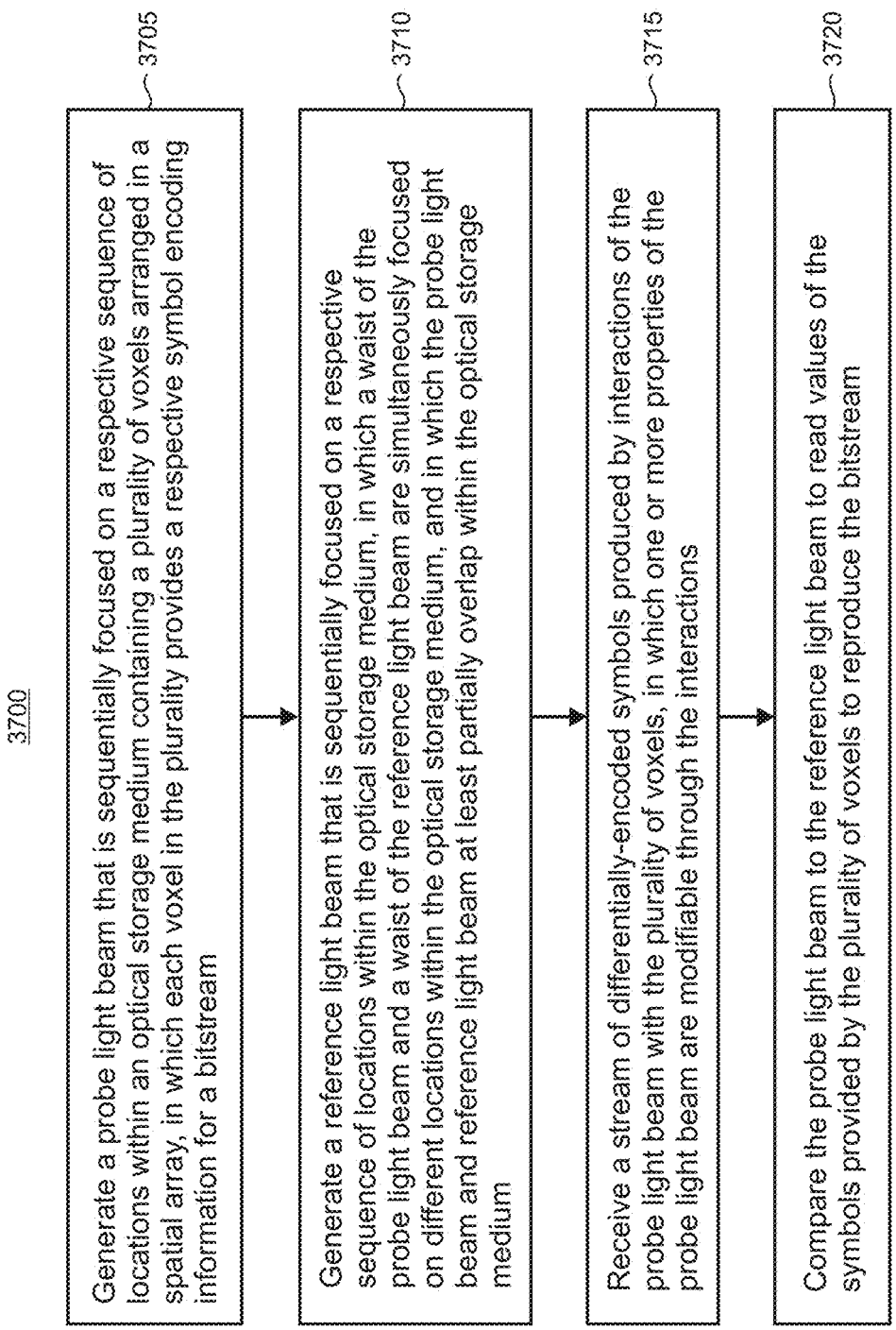

FIG. 37 is a flowchart of an illustrative method 3700 for optically reading data from an optical storage medium that may be implemented using a voxel reader arranged using the present principles. Block 3705 includes generating a probe light beam that is sequentially focused on a respective sequence of locations within an optical storage medium containing a plurality of voxels arranged in a spatial array, in which each voxel in the plurality provides a respective symbol encoding information for a bitstream.

Block 3710 includes generating a reference light beam that is sequentially focused on a respective sequence of locations within the optical storage medium, in which a waist of the probe light beam and a waist of the reference light beam are simultaneously focused on different locations within the optical storage medium, and in which the probe light beam and reference light beam at least partially overlap within the optical storage medium.

Block 3715 includes receiving a stream of differentially-encoded symbols produced by interactions of the probe light beam with the plurality of voxels, in which one or more properties of the probe light beam are modifiable through the interactions. Block 3720 includes comparing the probe light beam to the reference light beam to read values of the symbols provided by the plurality of voxels to reproduce the bitstream.

Figure 38:
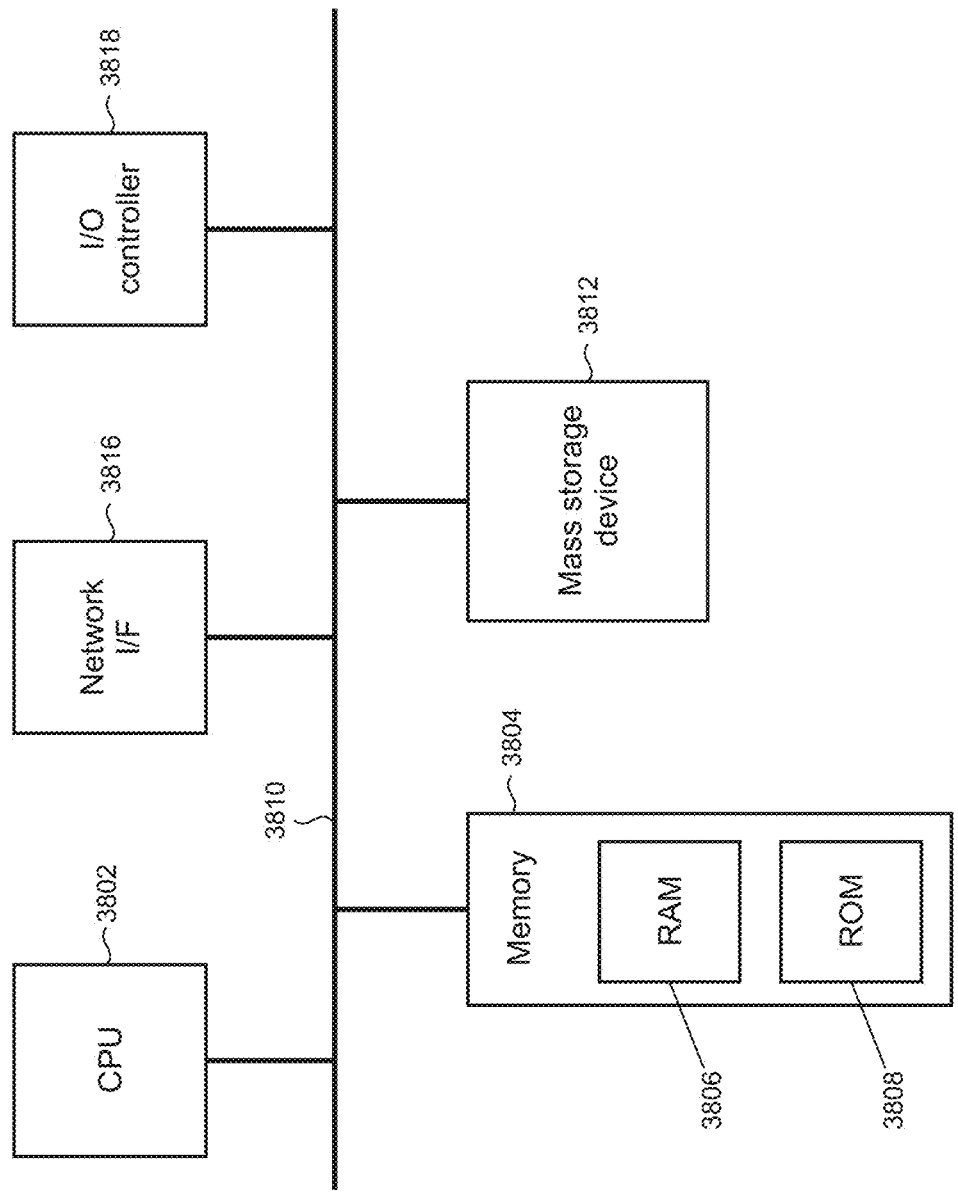
FIG. 38 is a simplified block diagram of an illustrative computing device that may be used, at least in part, to implement aspects of the present differential phase voxel symbol determination.

FIG. 38 shows an illustrative architecture 3800 for a computing device, such as a server, capable of executing the various components described herein. The architecture 3800 illustrated in FIG. 38 includes one or more processors 3802 (e.g., central processing unit, dedicated AI (artificial intelligence) chip, graphics processing unit, etc.), a system memory 3804, including RAM (random access memory) 3806 and ROM (read only memory) 3808, and a system bus 3810 that operatively and functionally couples the components in the architecture 3800. A basic input/output system containing the basic routines that help to transfer information between elements within the architecture 3800, such as during startup, is typically stored in the ROM 3808. The architecture 3800 further includes a mass storage device 3812 for storing software code or other computer-executed code that is utilized to implement applications, a file system, and an operating system (OS). The mass storage device 3812 is connected to the processor 3802 through a mass storage controller (not shown) connected to the bus 3810. The mass storage device 3812 and its associated computer-readable storage media provide non-volatile storage for the architecture 3800. Although the description of computer-readable storage media contained herein refers to a mass storage device, such as an HDD (hard disk drive) or CD (compact disc) drive, it may be appreciated by those skilled in the art that computer-readable storage media can be any available storage media that can be accessed by the architecture 3800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray or other optical storage, magnetic cassettes, magnetic tape, magnetic disk storage or other magnetic storage devices, or any other medium which can be used to store the desired information and which can be accessed by the architecture 3800.

According to various embodiments, the architecture 3800 may operate in a networked environment using logical connections to remote computers through a network. The architecture 3800 may connect to the network through a network interface unit 3816 connected to the bus 3810. It may be appreciated that the network interface unit 3816 also may be utilized to connect to other types of networks and remote computer systems. The architecture 3800 also may include an input/output controller 3818 for receiving and processing input from a number of other devices, including a keyboard, mouse, touchpad, touchscreen, and control devices such as buttons and switches or electronic stylus (not shown in FIG. 38). Similarly, the input/output controller 3818 may provide output to a display screen, user interface, a printer, or other type of output device (also not shown in FIG. 38).

It may be appreciated that the software components described herein may, when loaded into the processor 3802 and executed, transform the processor 3802 and the overall architecture 3800 from a general-purpose computing system into a special-purpose computing system customized to facilitate the functionality presented herein. The processor 3802 may be constructed from any number of transistors or other discrete circuit elements, which may individually or collectively assume any number of states. More specifically, the processor 3802 may operate as a finite-state machine, in response to executable instructions contained within the software modules disclosed herein. These computer-executable instructions may transform the processor 3802 by specifying how the processor 3802 transitions between states, thereby transforming the transistors or other discrete hardware elements constituting the processor 3802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3800 in order to store and execute the software components presented herein. It also may be appreciated that the architecture 3800 may include other types of computing devices, including wearable devices, handheld computers, embedded computer systems, smartphones, PDAs (personal digital assistants), and other types of computing devices known to those skilled in the art. It is also contemplated that the architecture 3800 may not include all of the components shown in FIG. 38, may include other components that are not explicitly shown in FIG. 38, or may utilize an architecture completely different from that shown in FIG. 38.

Various exemplary embodiments of the present differential phase voxel symbol determination are now presented by way of illustration and not as an exhaustive list of all embodiments. An example includes a method for optically reading data, the method comprising: providing an optical storage medium having a plurality of voxels located therein, the voxels storing a plurality of corresponding symbols for digitally encoding data, in which the optical storage medium comprises a three-dimensional transparent volume through which light is transmissible from an entrance of the volume to an exit of the volume, and in which a voxel is a light-scattering element in the volume; focusing a probe light beam at a first point within the volume, the probe light beam propagating in the volume from entrance to exit along a probe light beam propagation path, and in which the probe light beam has a first polarization state at the entrance to the volume; focusing a reference light beam at a second point within the volume, the reference light beam propagating in the volume from entrance to exit along a reference light beam propagation path, and in which the reference light beam has a second polarization state at the entrance of the volume that is orthogonal to the first polarization state, and wherein the probe and reference light beams propagation paths are at least partly spatially overlapping within the volume; and receiving, at an optical reader, the probe and reference light beams at the exit from the volume, the optical reader producing a first intensity signal containing contributions from both the probe and reference light beams.

In another example, the method further includes comparing the first intensity signal to a second intensity signal containing contributions from both the probe and reference light beams to determine a symbol value for a voxel. In another example, the voxels are distributed within the volume of the optical storage medium in layers and the probe light beam and reference light beam are focused on different voxels located in a common layer within the volume. In another example, the probe light beam is focused on a first voxel within the volume and the reference light beam is focused on a second voxel within the volume that is immediately adjacent to the first voxel. In another example, the probe light beam is focused on a voxel within the volume and the reference light beam is focused on a location within the volume that is a voxel-free location. In another example, the entrance is at a top surface of the volume and the exit is at a bottom surface of the volume and in which the probe light beam is focused at a first location above a voxel within the volume and the reference light beam is focused on a second location below the voxel, in which the first and second locations are voxel-free locations.

A further example includes one or more hardware-based non-transitory computer-readable memory devices storing computer-executable instructions which, upon execution by one or more processors disposed in a computing device, cause the computing device to: generate a probe light beam that is sequentially focused on a respective sequence of locations within an optical storage medium containing a plurality of voxels arranged in a spatial array, in which each voxel in the plurality provides a respective symbol encoding information for a bitstream; generate a reference light beam that is sequentially focused on a respective sequence of locations within the optical storage medium, in which a waist of the probe light beam and a waist of the reference light beam are simultaneously focused on different locations within the optical storage medium, and in which the probe light beam and reference light beam at least partially overlap within the optical storage medium; receive a stream of differentially-encoded symbols produced by interactions of the probe light beam with the plurality of voxels, in which one or more properties of the probe light beam are modifiable through the interactions; and compare the probe light beam to the reference light beam to read values of the symbols provided by the plurality of voxels to reproduce the bitstream.

In another example, the interactions cause a change in a state of polarization of the probe light beam and the comparing of the probe light beam to the reference light beam determines a differential change in state of polarization between the probe and reference light beams. In another example, the interactions cause a change in phase of the probe light beam and the comparing of the probe light beam to the reference light beam determines a differential phase change between the probe and reference light beams. In another example, the probe light beam and reference light beam are orthogonally polarized. In another example, the probe light beam and reference light beam are circularly polarized having opposite handedness. In another example, the probe light beam and reference light beam overlap to mitigate against phase perturbations caused by inter-symbol interference. In another example, the waist of the probe light beam is focused on a voxel in the optical storage medium and the waist of the reference light beam is focused on a location in the storage medium that is adjacent to the voxel. In another example, the spatial array of voxels is layered and the waists of the respective probe and reference light beams are focused on locations in a common layer of the array. In another example, the voxels are associated with symbols encoded in one of differential phase shift keying (DPSK) or differential quaternary phase shift keying (DQPSK).

A further example includes a differential phase voxel reader configured for reading data from an optical storage medium containing a plurality of voxels, comprising: a polarization beam splitter configured to receive a probe light beam and a reference light beam after propagating through the optical storage medium, wherein the probe light beam and reference light beam are orthogonally polarized and are each simultaneously focused at different locations within the optical storage medium with at least partially overlapping propagation paths through the optical storage medium, and wherein the polarization beam splitter provides a first output and a second output having orthogonal polarization states in which each of the first output and second output have substantially equal contribution from the probe and reference light beams; a first photodetector arranged to receive the first output of the polarization beam splitter and responsively generate a first electrical signal; a second photodetector arranged to receive the second output of the polarization beam splitter and responsively generate a second electrical signal; and a first differential amplifier arranged to receive the first and second electrical signals and responsively generate a first difference signal indicating a phase difference between the probe light beam and the reference light beam.

In another example of the differential phase voxel reader, a voxel provides a symbol encoded using two phase values. In another example, the differential phase voxel reader further comprises: an eighth-wave retarder through which the probe light beam and the reference light beam pass prior to impinging on the polarization beam splitter; a partially-reflecting mirror receiving the probe light beam and the reference light beam from the eighth-wave retarder, the partially-reflecting mirror splitting the probe and reference light beams into a first propagation path and a second propagation path, wherein light from the probe and reference light beams in the first propagation path impinge on the polarization beam splitter; a quarter-wave retarder receiving light from the probe and the reference light beams in the second propagation path; a second polarization beam splitter receiving light from the probe and reference light beams in the second propagation path from the quarter-wave retarder, wherein the second polarization beam splitter provides a first output and a second output having orthogonal polarization states in which each of the first output and second output have equal contributions from the probe and reference light beams in the second propagation path; a third photodetector arranged to receive the first output of the second polarization beam splitter and responsively generate a third electrical signal; a fourth photodetector arranged to receive the second output of the second polarization beam splitter and responsively generate a fourth electrical signal; and a second differential amplifier arranged to receive the third and fourth electrical signals and responsively generate a second difference signal indicating a phase difference between the probe and reference light beams in the second propagation path. In another example, a voxel provides a symbol encoded using four phase values. In another example, the differential phase voxel reader further comprises a post processor configured to determine a symbol value of a voxel using the first and second difference signals.

Although the subject matter has been described in language specific to structural features and/or methodological acts, it is to be understood that the subject matter defined in the appended claims is not necessarily limited to the specific features, components, elements, and/or acts described above. Rather, the specific features, components, elements, and/or acts described above are disclosed as exemplary forms of implementing the claims, but are not necessarily the sole forms of implementing the claims.

What is claimed:

1. A method for optically reading data, the method comprising:
   providing an optical storage medium having a plurality of voxels located therein, the voxels storing a plurality of corresponding symbols for digitally encoding data, in which the optical storage medium comprises a three-dimensional transparent volume through which light is transmissible from an entrance of the volume to an exit of the volume, and in which a voxel is a light-scattering element in the volume;
   focusing a probe light beam at a first point within the volume, the probe light beam propagating in the volume from entrance to exit along a probe light beam propagation path, and in which the probe light beam has a first polarization state at the entrance to the volume;
   focusing a reference light beam at a second point within the volume, the reference light beam propagating in the volume from entrance to exit along a reference light beam propagation path, and in which the reference light beam has a second polarization state at the entrance of the volume that is orthogonal to the first polarization state, and wherein the probe and reference light beams propagation paths are at least partly spatially overlapping within the volume; and
   receiving, at an optical reader, the probe and reference light beams at the exit from the volume, the optical reader producing a first intensity signal containing contributions from both the probe and reference light beams.

2. The method of claim 1 further including comparing the first intensity signal to a second intensity signal containing contributions from both the probe and reference light beams to determine a symbol value for a voxel.

3. The method of claim 1 in which the voxels are distributed within the volume of the optical storage medium in layers and the probe light beam and reference light beam are focused on different voxels located in a common layer within the volume.

4. The method of claim 1 in which the probe light beam is focused on a first voxel within the volume and the reference light beam is focused on a second voxel within the volume that is immediately adjacent to the first voxel.

5. The method of claim 1 in which the probe light beam is focused on a voxel within the volume and the reference light beam is focused on a location within the volume that is a voxel-free location.

6. The method of claim 1 in which the entrance is at a top surface of the volume and the exit is at a bottom surface of the volume and in which the probe light beam is focused at a first location above a voxel within the volume and the reference light beam is focused on a second location below the voxel, in which the first and second locations are voxel-free locations.

7. One or more hardware-based non-transitory computer-readable memory devices storing computer-executable instructions which, upon execution by one or more processors disposed in a computing device, cause the computing device to:
  generate a probe light beam that is sequentially focused on a respective sequence of locations within an optical storage medium containing a plurality of voxels arranged in a spatial array, in which each voxel in the plurality provides a respective symbol encoding information for a bitstream;
  generate a reference light beam that is sequentially focused on a respective sequence of locations within the optical storage medium, in which a waist of the probe light beam and a waist of the reference light beam are simultaneously focused on different locations within the optical storage medium, and in which the probe light beam and reference light beam at least partially overlap within the optical storage medium;
  receive a stream of differentially-encoded symbols produced by interactions of the probe light beam with the plurality of voxels, in which one or more properties of the probe light beam are modifiable through the interactions; and
  compare the probe light beam to the reference light beam to read values of the symbols provided by the plurality of voxels to reproduce the bitstream.

8. The one or more hardware-based non-transitory computer-readable memory devices of claim 7 in which the interactions cause a change in a state of polarization of the probe light beam and the comparing of the probe light beam to the reference light beam determines a differential change in state of polarization between the probe and reference light beams.

9. The one or more hardware-based non-transitory computer-readable memory devices of claim 7 in which the interactions cause a change in phase of the probe light beam and the comparing of the probe light beam to the reference light beam determines a differential phase change between the probe and reference light beams.

10. The one or more hardware-based non-transitory computer-readable memory devices of claim 7 in which the probe light beam and reference light beam are orthogonally polarized.

11. The one or more hardware-based non-transitory computer-readable memory devices of claim 7 in which the probe light beam and reference light beam are circularly polarized having opposite handedness.

12. The one or more hardware-based non-transitory computer-readable memory devices of claim 7 in which the probe light beam and reference light beam overlap to mitigate against phase perturbations caused by inter-symbol interference.

13. The one or more hardware-based non-transitory computer-readable memory devices of claim 7 in which the waist of the probe light beam is focused on a voxel in the optical storage medium and the waist of the reference light beam is focused on a location in the storage medium that is adjacent to the voxel.

14. The one or more hardware-based non-transitory computer-readable memory devices of claim 13 in which the spatial array of voxels is layered and the waists of the respective probe and reference light beams are focused on locations in a common layer of the array.

15. The one or more hardware-based non-transitory computer-readable memory devices of claim 7 in which the voxels are associated with symbols encoded in one of differential phase shift keying (DPSK) or differential quaternary phase shift keying (DQPSK).

16. A differential phase voxel reader configured for reading data from an optical storage medium containing a plurality of voxels, comprising:
  a polarization beam splitter configured to receive a probe light beam and a reference light beam after propagating through the optical storage medium, wherein the probe light beam and reference light beam are orthogonally polarized and are each simultaneously focused at different locations within the optical storage medium with at least partially overlapping propagation paths through the optical storage medium, and wherein the polarization beam splitter provides a first output and a second output having orthogonal polarization states in which each of the first output and second output have substantially equal contribution from the probe and reference light beams;
  a first photodetector arranged to receive the first output of the polarization beam splitter and responsively generate a first electrical signal;
  a second photodetector arranged to receive the second output of the polarization beam splitter and responsively generate a second electrical signal; and
  a first differential amplifier arranged to receive the first and second electrical signals and responsively generate a first difference signal indicating a phase difference between the probe light beam and the reference light beam.

17. The differential phase voxel reader of claim 16 in which a voxel provides a symbol encoded using two phase values.

18. The differential phase voxel reader of claim 16 further comprising:
  an eighth-wave retarder through which the probe light beam and the reference light beam pass prior to impinging on the polarization beam splitter;
  a partially-reflecting mirror receiving the probe light beam and the reference light beam from the eighth-wave retarder, the partially-reflecting mirror splitting the probe and reference light beams into a first propagation path and a second propagation path, wherein light from the probe and reference light beams in the first propagation path impinge on the polarization beam splitter;
  a quarter-wave retarder receiving light from the probe and the reference light beams in the second propagation path;
  a second polarization beam splitter receiving light from the probe and reference light beams in the second propagation path from the quarter-wave retarder, wherein the second polarization beam splitter provides a first output and a second output having orthogonal polarization states in which each of the first output and second output have equal contributions from the probe and reference light beams in the second propagation path;

a third photodetector arranged to receive the first output of the second polarization beam splitter and responsively generate a third electrical signal;

a fourth photodetector arranged to receive the second output of the second polarization beam splitter and responsively generate a fourth electrical signal; and a second differential amplifier arranged to receive the third and fourth electrical signals and responsively generate a second difference signal indicating a phase difference between the probe and reference light beams in the second propagation path.

19. The differential phase voxel reader of claim 18 in which a voxel provides a symbol encoded using four phase values.

20. The differential phase voxel reader of claim 18 further comprising a post processor configured to determine a symbol value of a voxel using the first and second difference signals.

* * * * *